US009956800B2

(12) United States Patent
Okazawa et al.

(10) Patent No.: US 9,956,800 B2
(45) Date of Patent: May 1, 2018

(54) READING APPARATUS AND RECORDING APPARATUS

(71) Applicant: SEIKO EPSON CORPORATION, Tokyo (JP)

(72) Inventors: Yoshiyuki Okazawa, Shiojiri (JP); Shintaro Miyamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/441,084

(22) Filed: Feb. 23, 2017

(65) Prior Publication Data

US 2017/0246894 A1    Aug. 31, 2017

(30) Foreign Application Priority Data

Feb. 26, 2016    (JP) ................. 2016-035249

(51) Int. Cl.
| | |
|---|---|
| *H04N 1/00* | (2006.01) |
| *B41J 29/393* | (2006.01) |
| *B41J 2/01* | (2006.01) |
| *B41J 29/02* | (2006.01) |
| *B41J 29/13* | (2006.01) |

(52) U.S. Cl.
CPC .............. *B41J 29/393* (2013.01); *B41J 2/01* (2013.01); *B41J 29/02* (2013.01); *B41J 29/13* (2013.01); *H04N 1/00551* (2013.01); *H04N 1/00554* (2013.01); *H04N 1/00559* (2013.01); *B41J 2029/3937* (2013.01); *H04N 2201/006* (2013.01); *H04N 2201/0062* (2013.01); *H04N 2201/0063* (2013.01); *H04N 2201/0081* (2013.01); *H04N 2201/0094* (2013.01)

(58) Field of Classification Search
CPC ....... B41J 2/01; B41J 29/393; H04N 1/00551; H04N 1/00554; H04N 1/00559
See application file for complete search history.

(56) References Cited

U.S. PATENT DOCUMENTS

| | | | | |
|---|---|---|---|---|
| 8,213,060 | B2 * | 7/2012 | Fujibayashi | ....... H04N 1/00551 358/474 |
| 8,994,997 | B2 * | 3/2015 | Chen | ...................... G06K 15/40 358/1.1 |
| 9,369,598 | B2 * | 6/2016 | Tomoda | ............. H04N 1/00525 |
| 9,538,032 | B2 * | 1/2017 | Ishizuka | ............ H04N 1/00554 |
| 9,560,226 | B2 * | 1/2017 | Kikuta | ............... H04N 1/00554 |
| 9,681,008 | B2 * | 6/2017 | Tokuyama | ........... H04N 1/0032 |
| 2013/0229673 | A1 | 9/2013 | Nakayama et al. | |
| 2013/0286433 | A1 | 10/2013 | Matsushima et al. | |
| 2014/0132652 | A1 | 5/2014 | Nakamura | |

FOREIGN PATENT DOCUMENTS

| | | |
|---|---|---|
| JP | 2013-187566 | 9/2013 |
| JP | 2013-228540 | 11/2013 |
| JP | 2014-096717 | 5/2014 |

* cited by examiner

*Primary Examiner* — Anh T. N. Vo
(74) *Attorney, Agent, or Firm* — Workman Nydegger

(57) ABSTRACT

A main body portion provided with a document stand on which a document is placed and a reading unit; a cover which opens and closes the document stand; and a near field communication unit on the inside of the cover, are provided.

10 Claims, 23 Drawing Sheets

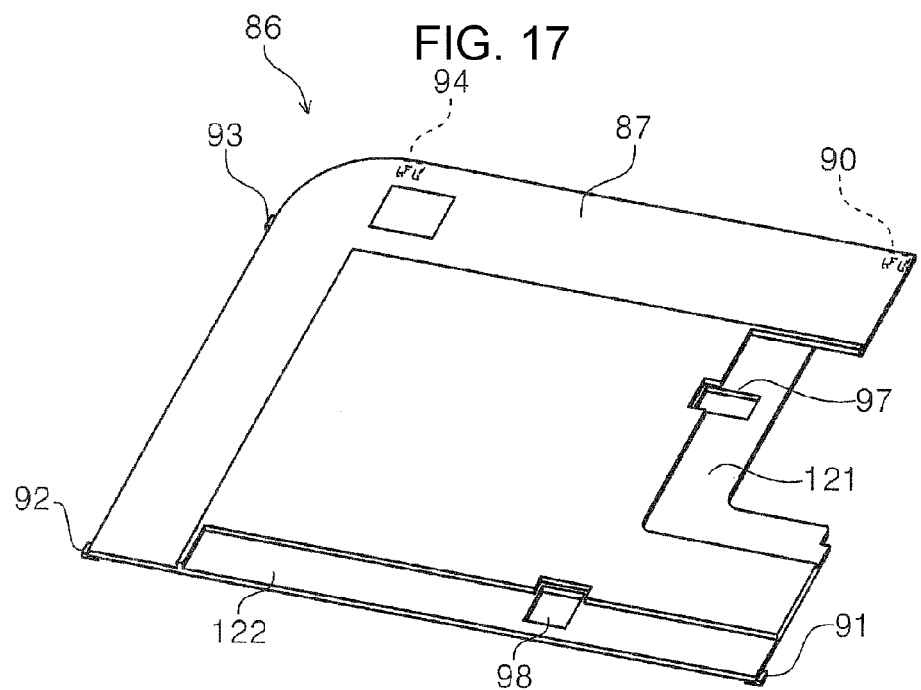
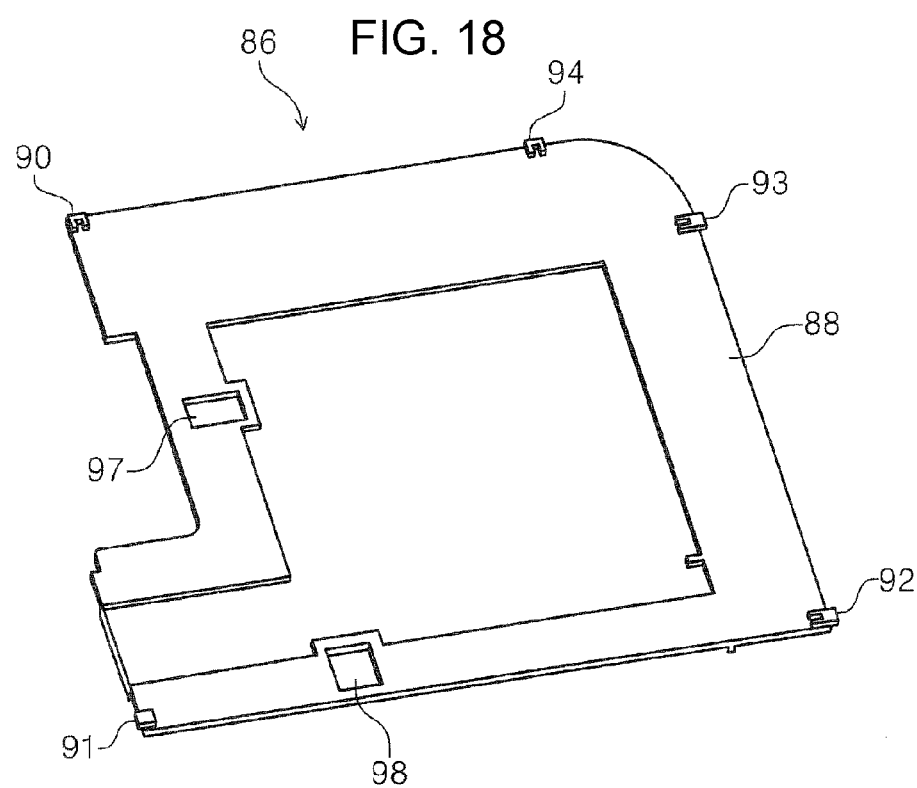

READING APPARATUS AND RECORDING APPARATUS

BACKGROUND

1. Technical Field

The present invention relates to a reading apparatus which reads a document and a recording apparatus which performs recording on a recording medium.

2. Related Art

In a reading apparatus which reads a document, there are a type which reads the document by loading the document on a glass surface, and a type which reads the document by loading the document on a medium loading surface and transporting the document. In addition, in a recording apparatus which performs recording on the recording medium, there is a type (a type called a multifunction machine or the like) including a reading mechanism portion (scanner) which reads the document, above a recording mechanism portion that performs the recording on the recording medium.

In addition, in the recording apparatus, similar to JP-A-2014-096717 and JP-A-2013-228540, a configuration in which a near field communication (NFC) is performed, is employed. Furthermore, the near field communication is a near field type wireless communication, and a communication area is approximately several centimeters to 1 meter. A user uses the near field communication, and for example, sets the recording apparatus, or transfers image data to the recording apparatus from a portable terminal, and additionally, print-out or the like is performed.

It is preferable that a substrate (near field communication substrate) including an antenna which is used in the near field communication be provided in the reading apparatus and on an upper surface of the reading apparatus from the viewpoint of operability of the user in the recording apparatus.

SUMMARY

An advantage of some aspects of the invention is to perform excellent communication by appropriately disposing a near field communication unit in a reading apparatus and in a recording apparatus provided with a reading mechanism portion in an upper portion of the recording mechanism portion.

According to an aspect of the invention, there is provided a recording apparatus including: a recording mechanism portion provided with a recording unit that performs recording on a recording medium; and a reading mechanism portion which is provided in an upper portion of the recording mechanism portion, and reads a document, in which the reading mechanism portion includes a main body portion provided with a document stand on which the document is placed and a reading unit that reads the document, and a cover that opens and closes the document stand, in which a near field communication unit for performing near field communication is provided on the inside of the cover.

According to the aspect, since the near field communication unit is provided in the cover that opens and closes the document stand, the user can easily put communication equipment from the upper part of the recording apparatus, and the operability is improved.

In the recording apparatus, the cover may include a cover main body which forms an upper surface of the cover, and an auxiliary cover which nips the near field communication unit between the auxiliary cover and the cover main body, and covers the near field communication unit.

According to the aspect, since the cover includes the cover main body which forms the upper surface of the cover, and the auxiliary cover which nips the near field communication unit between the auxiliary cover and the cover main body, and covers the near field communication unit, it is possible to protect the near field communication unit by the auxiliary cover. In addition, the rigidity of the cover is also improved.

In the recording apparatus, a metal plate may further be provided in a region that avoids the near field communication unit between the auxiliary cover and the cover main body.

According to the aspect, since the metal plate is provided in the region that avoids the near field communication unit between the auxiliary cover and the cover main body, the rigidity of the cover is more improved by the metal plate. However, since the metal plate is provided in the region that avoids the near field communication unit, it is possible to suppress defects that cause damage to the near field communication.

In the recording apparatus, the cover may be provided to be capable of opening and closing the document stand by rotating around a rotation shaft provided in an end portion in the direction intersecting with the moving direction of the reading unit, a thin portion may be formed along the moving direction of the reading unit outside a region that overlaps a moving region of the reading unit in a state where the cover is closed, on a free end side of the cover main body, and the plate and the near field communication unit may be disposed in the thin portion.

According to the aspect, since the plate and the near field communication unit are disposed in the thin portion formed in the cover main body, it is possible to suppress an increase in thickness of the cover according to the disposition of the plate and the near field communication unit.

In the recording apparatus, play may be provided in a bonding portion between the cover main body and the auxiliary cover.

According to the aspect, since the play is provided in the bonding portion between the cover main body and the auxiliary cover, when the cover main body and the auxiliary cover are bonded to each other, it is possible to make it difficult to receive influence of accuracy of components opposite to each other. For example, even when there is a curve in one of the cover main body and the auxiliary cover, as there is the play in the bonding portion, it is possible to avoid generation of a curve as the entire cover when both are bonded to each other.

According to another aspect of the invention, there is provided a recording apparatus including: a recording mechanism portion provided with a recording unit that performs recording on a recording medium; and a reading mechanism portion which is provided in an upper portion of the recording mechanism portion, and reads a document, in which the reading mechanism portion includes a main body portion provided with a document stand on which the document is placed and a reading unit that reads the document, and a cover that opens and closes the document stand, in which the recording mechanism portion includes an operation panel on an apparatus front surface, and in which the cover has a part that approaches an upper portion of the operation panel in a closed state, and the near field communication unit is disposed in the upper portion of the operation panel.

According to the aspect, since the cover has a part that approaches the upper portion of the operation panel in a closed state, and the near field communication unit is disposed in the upper portion of the operation panel, the operation part is settled at one location, and compared to a configuration in which the near field communication unit is disposed in a place separated from the operation panel, the operability of the user is improved.

According to still another aspect of the invention, there is provided a recording apparatus including: a recording mechanism portion provided with a recording unit that performs recording on a recording medium; and a reading mechanism portion which is provided in an upper portion of the recording mechanism portion, and reads a document, in which the reading mechanism portion includes a main body portion provided with a document stand on which the document is placed and a reading unit that reads the document, and a cover that opens and closes the document stand, and in which the cover includes a plate and a near field communication unit provided in a region shifted from a disposition region of the plate.

According to the aspect, since cover includes the plate and the near field communication unit provided in the region shifted from the disposition region of the plate, the rigidity of the cover is improved by the plate, and since the plate is provided in the region that avoids the near field communication unit, the plate can suppress defects that cause damage to the near field communication.

In the recording apparatus, the near field communication unit may be provided at a position which is in a region that overlaps a moving region of the reading unit in a state where the cover is closed, that is, which is shifted from a home position of the reading unit.

According to the aspect, since the near field communication unit is provided at a position which is in the region that overlaps the moving region of the reading unit in a state where the cover is closed, that is, which is shifted from the home position of the reading unit, a state where the near field communication unit and the reading unit are separated from each other when the near field communication is performed, is easily achieved, and accordingly, it is possible to suppress defects that cause damage to the near field communication, and it is possible to perform excellent communication.

In the recording apparatus, the recording mechanism portion may include a power source portion which supplies power when driving a driving target including the recording unit, and the near field communication unit may be positioned above the power source portion in a state where the cover is closed.

According to the aspect, in the recording apparatus in which the near field communication unit is positioned above the power source portion in a state where the cover is closed, the effects similar to those of the first to the eight aspects are obtained.

BRIEF DESCRIPTION OF THE DRAWINGS

The invention will be described with reference to the accompanying drawings, wherein like numbers reference like elements.

FIG. 17 is a perspective view of first parts which configure the auxiliary cover illustrated in FIG. 16.

FIG. 18 is a perspective view when the first parts illustrated in FIG. 17 are viewed from a rear surface.

DESCRIPTION OF EXEMPLARY EMBODIMENTS

Example 1

First, an overview of a recording apparatus according to one example of the invention will be described. In the example, an example of the recording apparatus includes an ink jet type printer (hereinafter, simply referred to as a printer).

Figure 1:
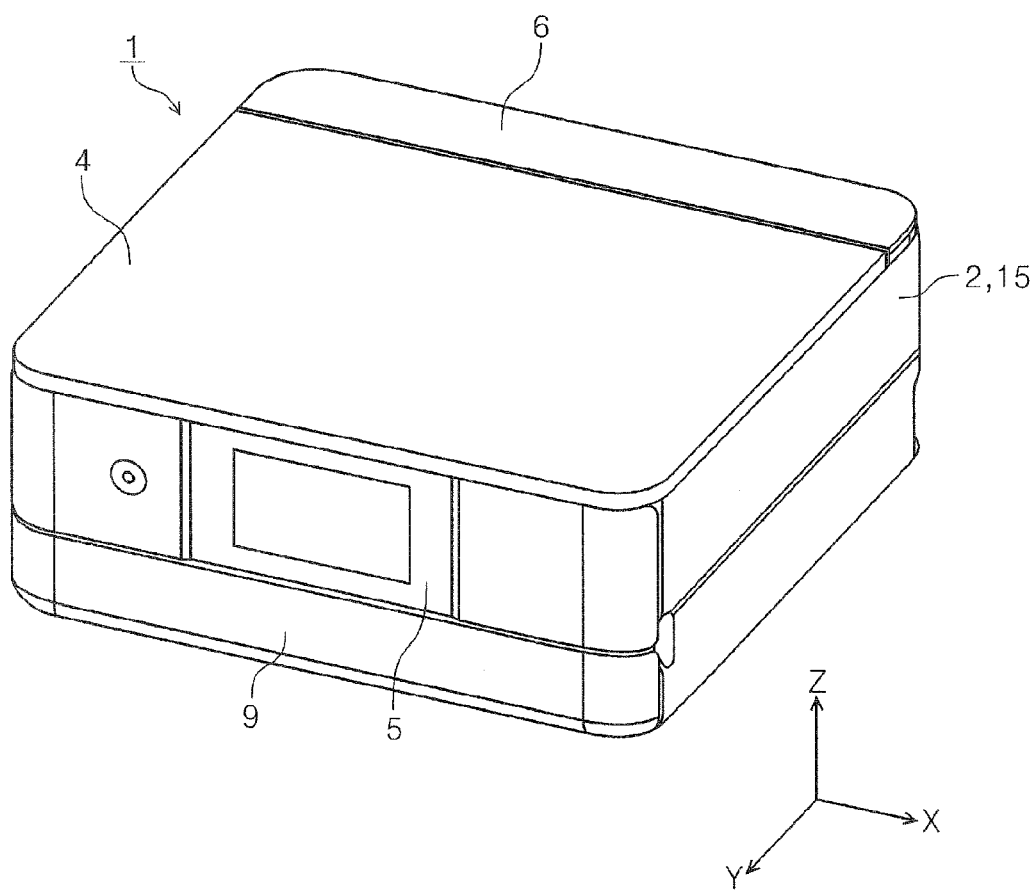
FIG. 1 is an external perspective view of a printer according to the invention.
Figure 2:
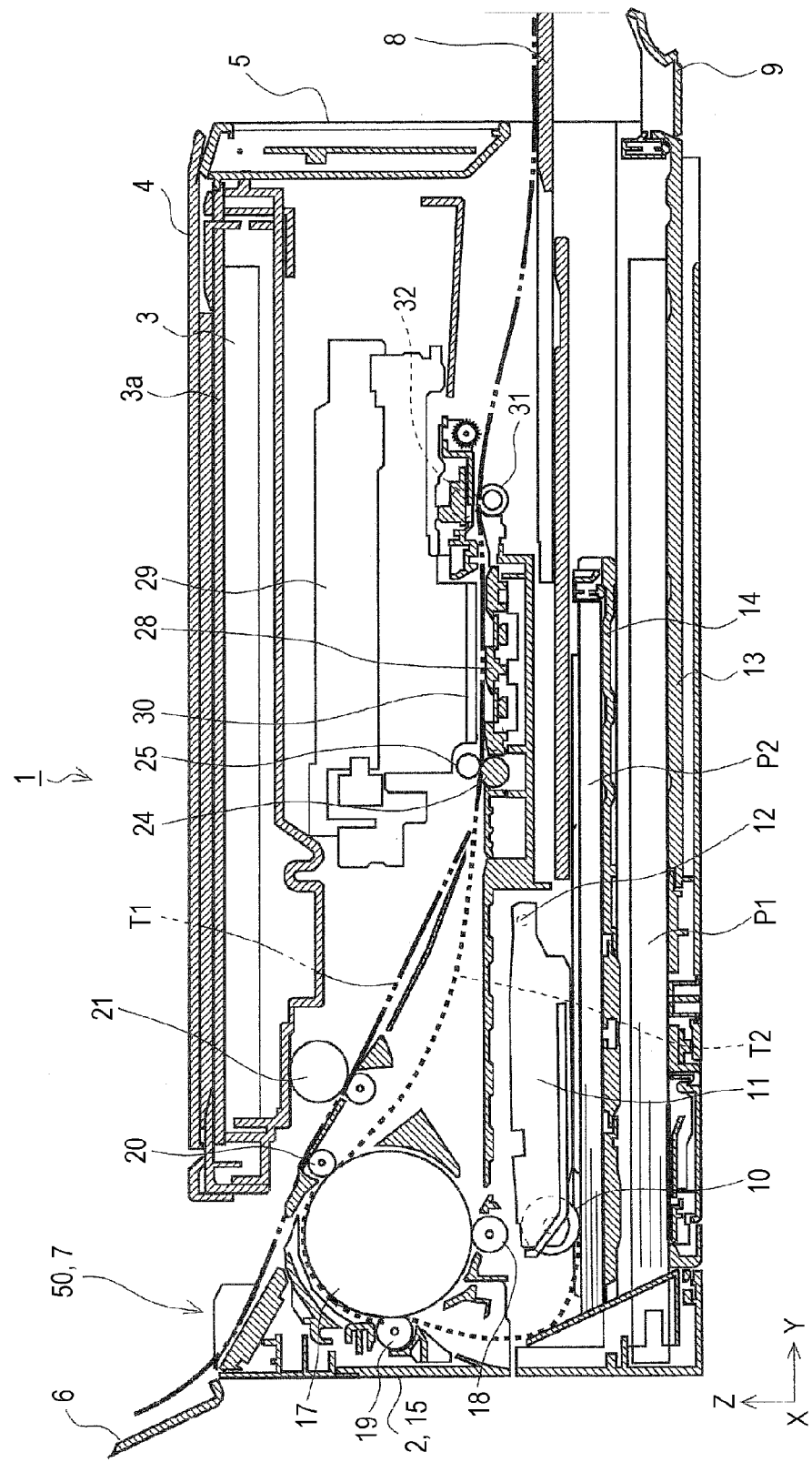
FIG. 2 is a view illustrating a paper transporting path of the printer according to the invention.
Figure 3:
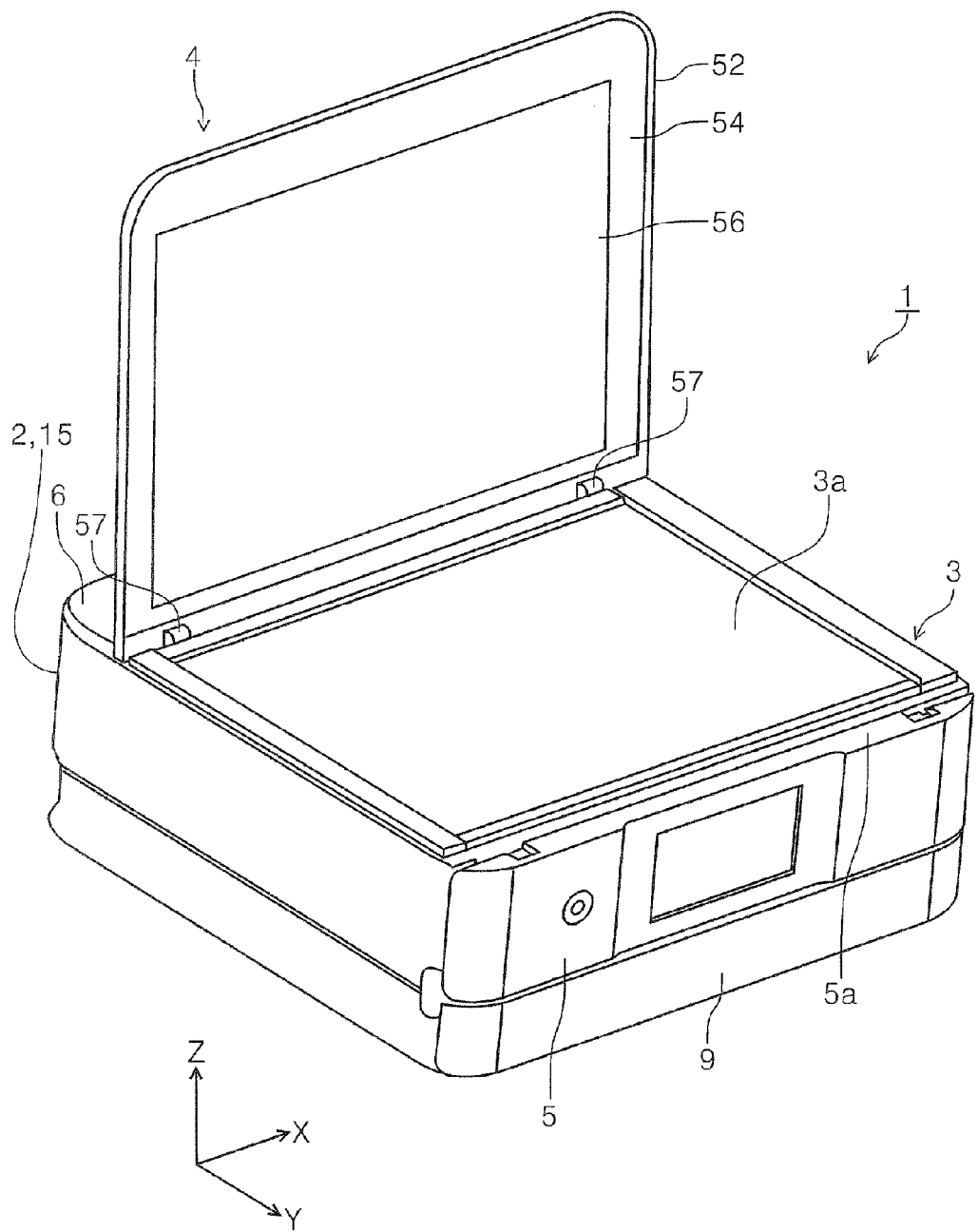
FIG. 3 is a perspective view illustrating a state where a cover of a reading mechanism portion is open in the printer according to the invention.
Figure 4:
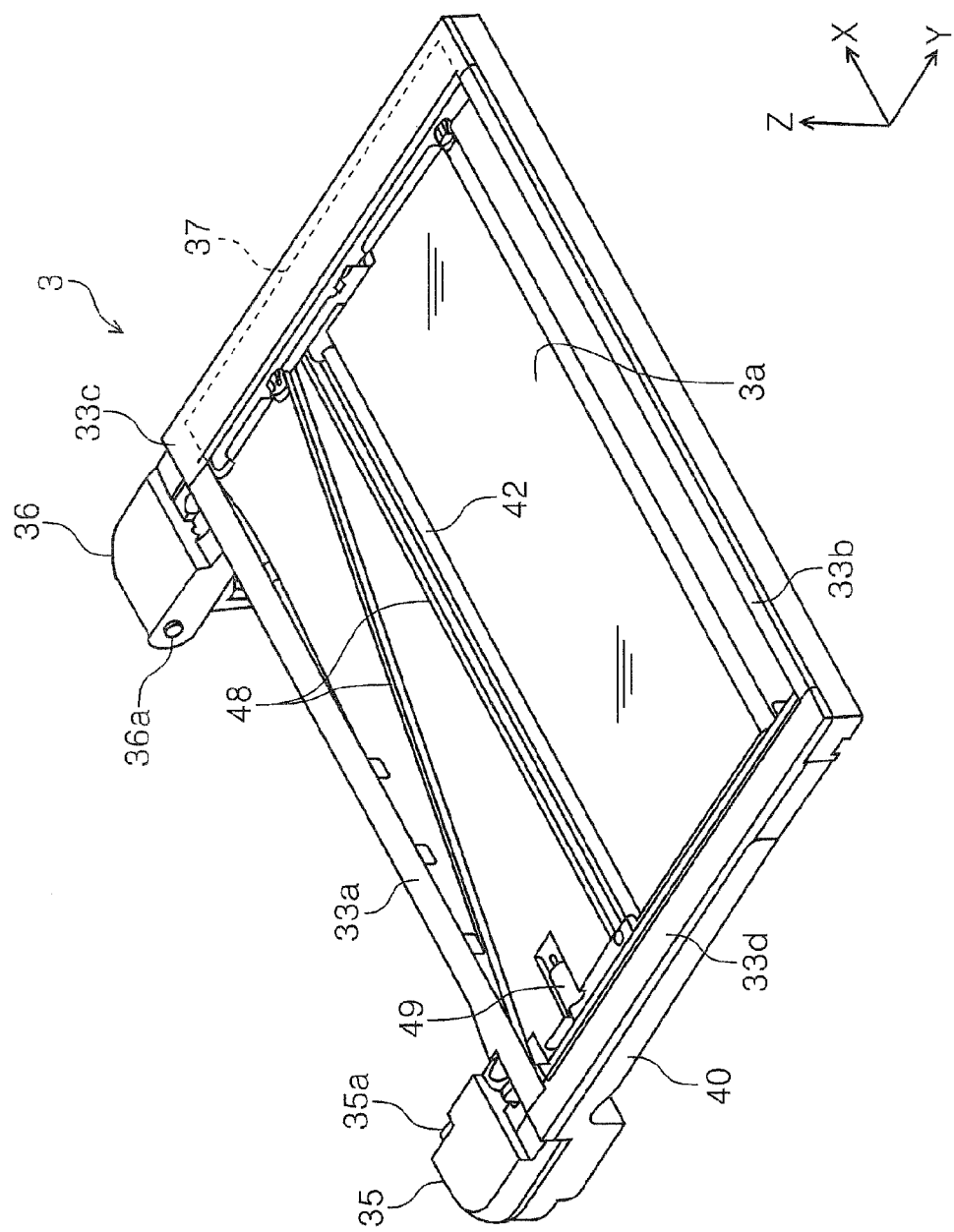
FIG. 4 is a perspective view illustrating a state where the cover of the reading mechanism portion is removed.
Figure 5:
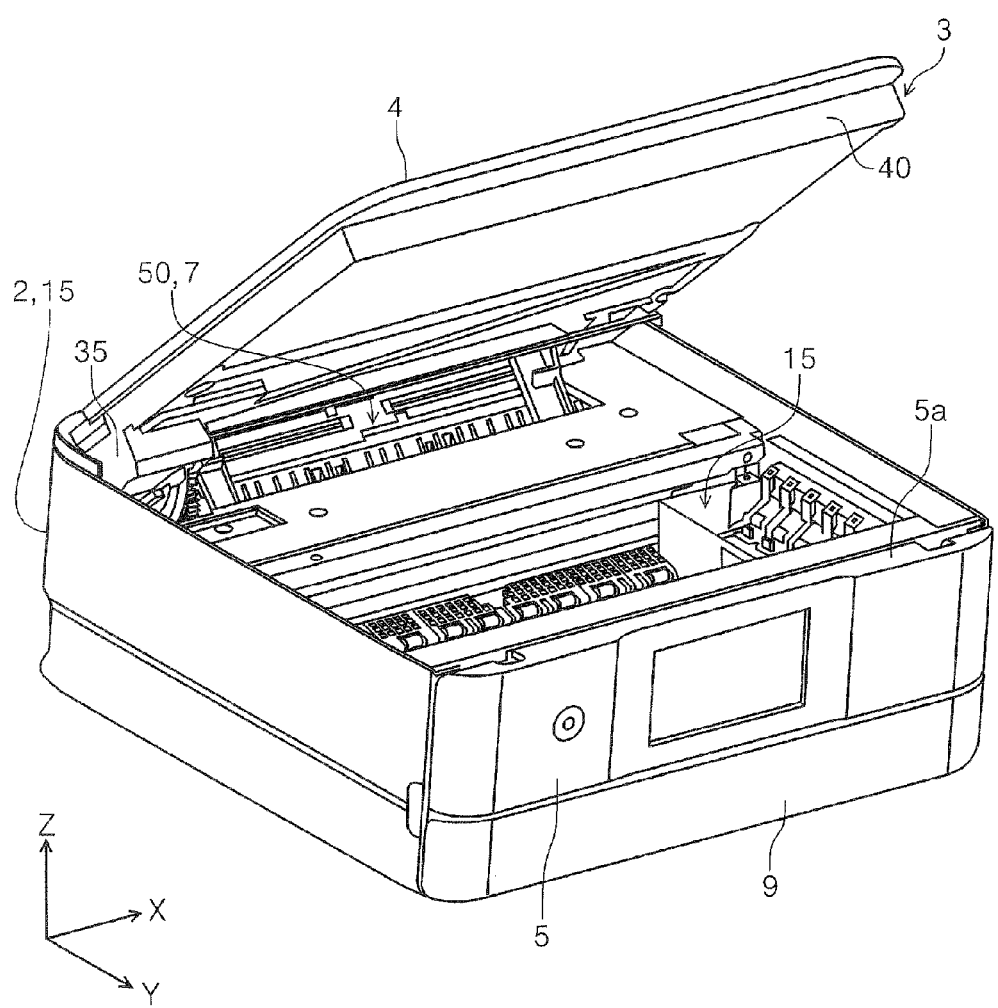
FIG. 5 is a perspective view illustrating a state where the reading mechanism portion is open with respect to a recording mechanism portion main body in the printer according to the invention.
Figure 6:
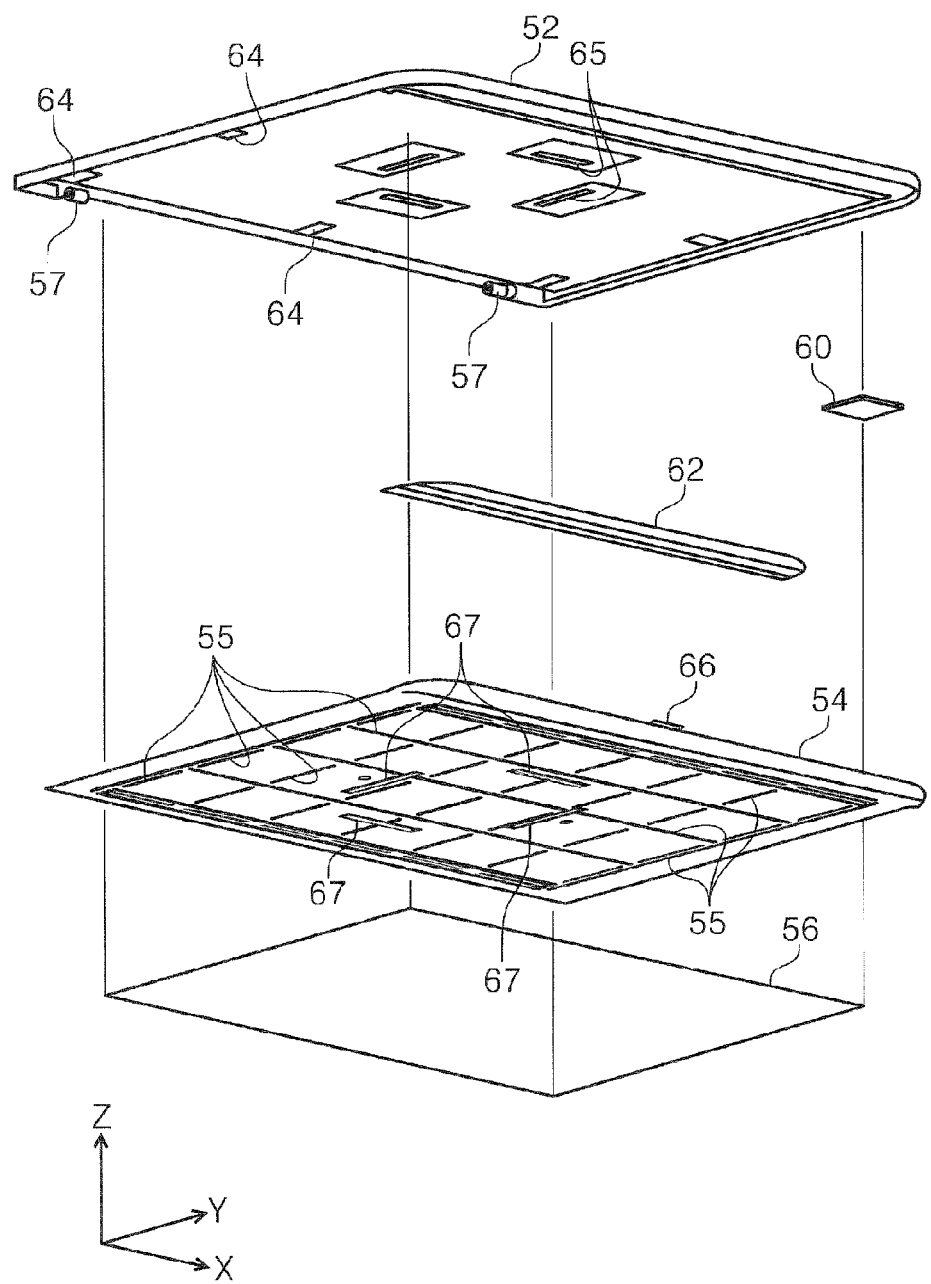
FIG. 6 is an exploded perspective view of the cover of the reading mechanism portion.
Figure 7:
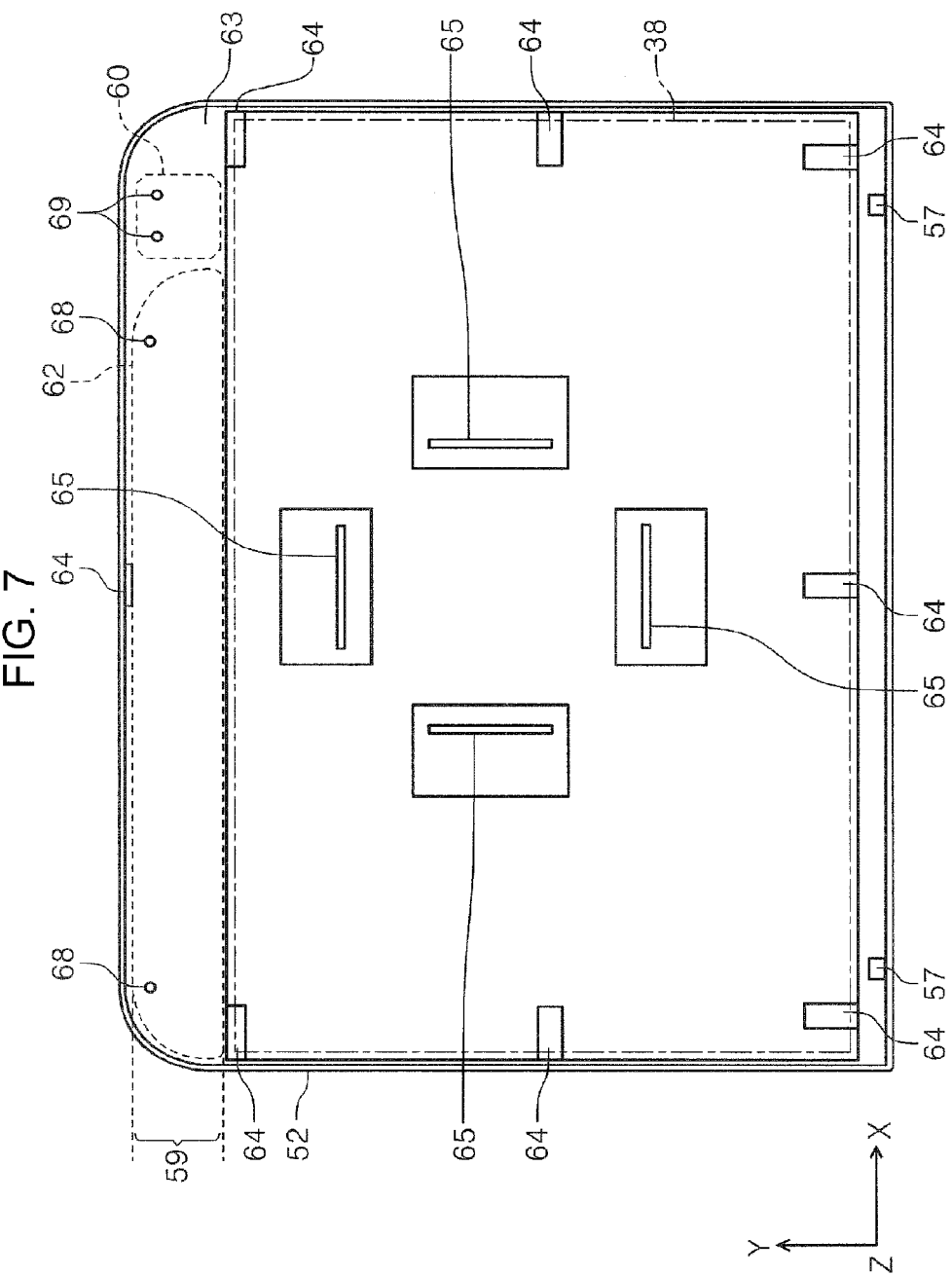
FIG. 7 is a bottom view of a cover main body which configures the cover.
Figure 8:
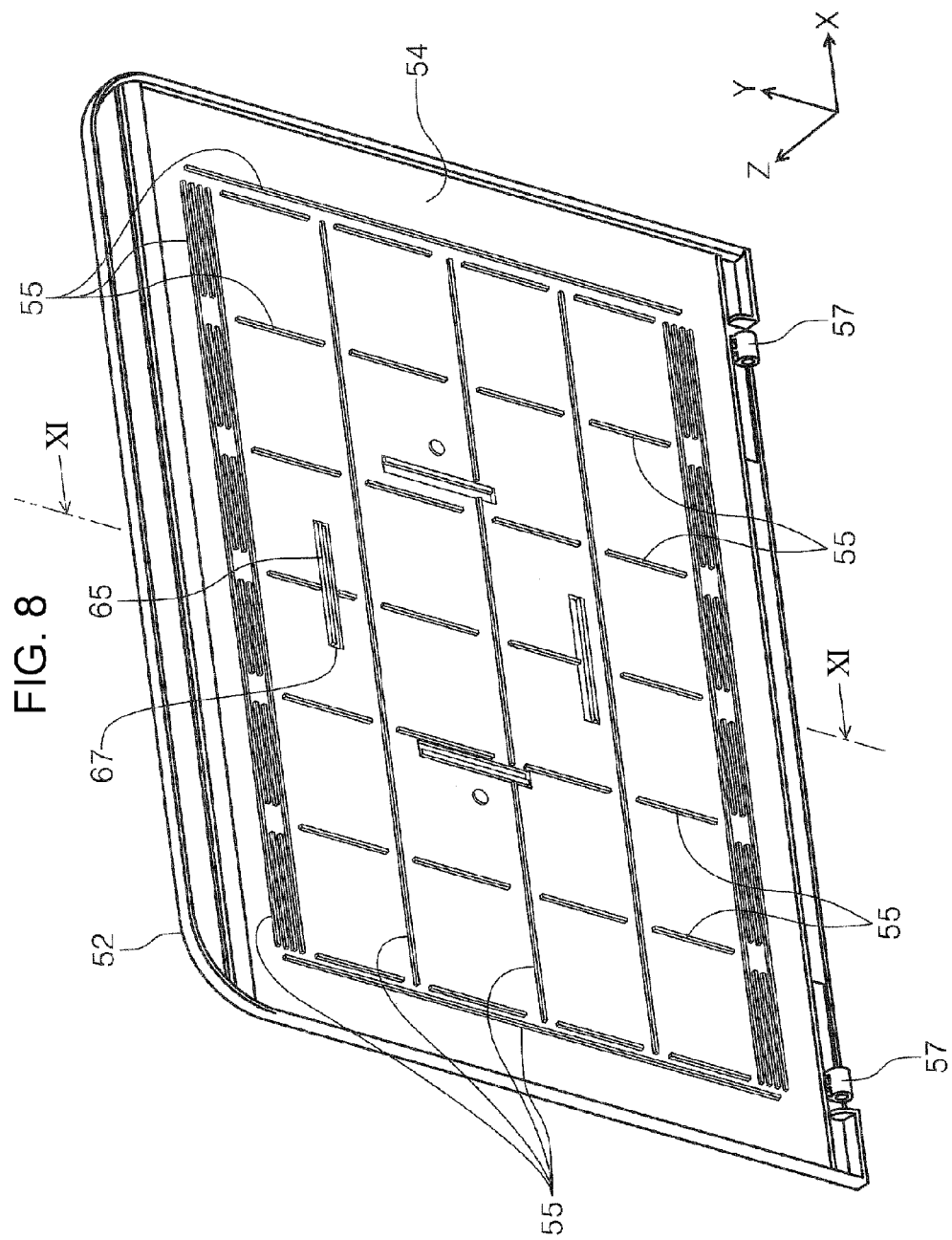
FIG. 8 is a perspective view illustrating a state where an auxiliary cover is attached to the cover main body.
Figure 9:
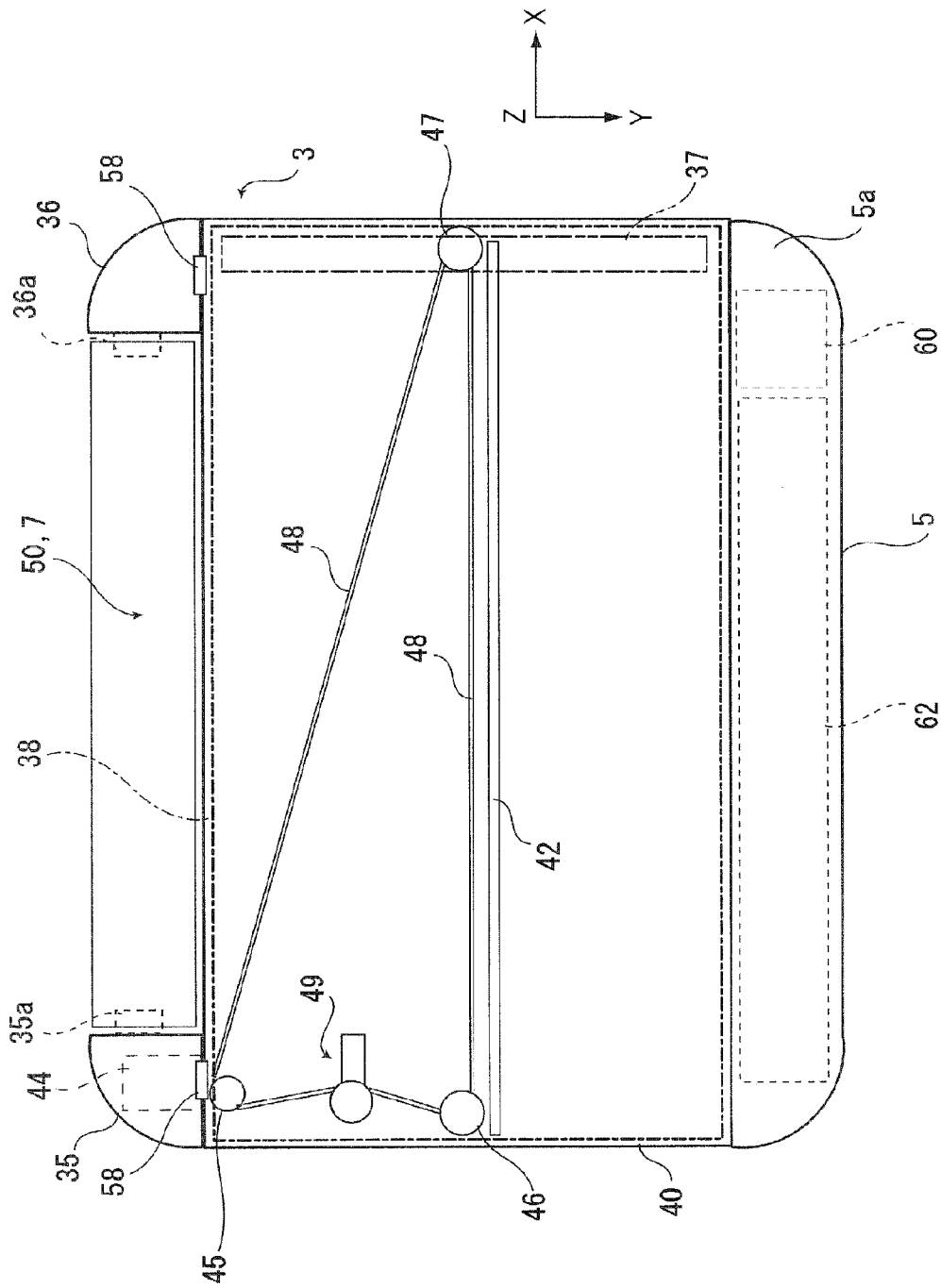
FIG. 9 is a schematic plan view of the reading mechanism portion.
Figure 10:
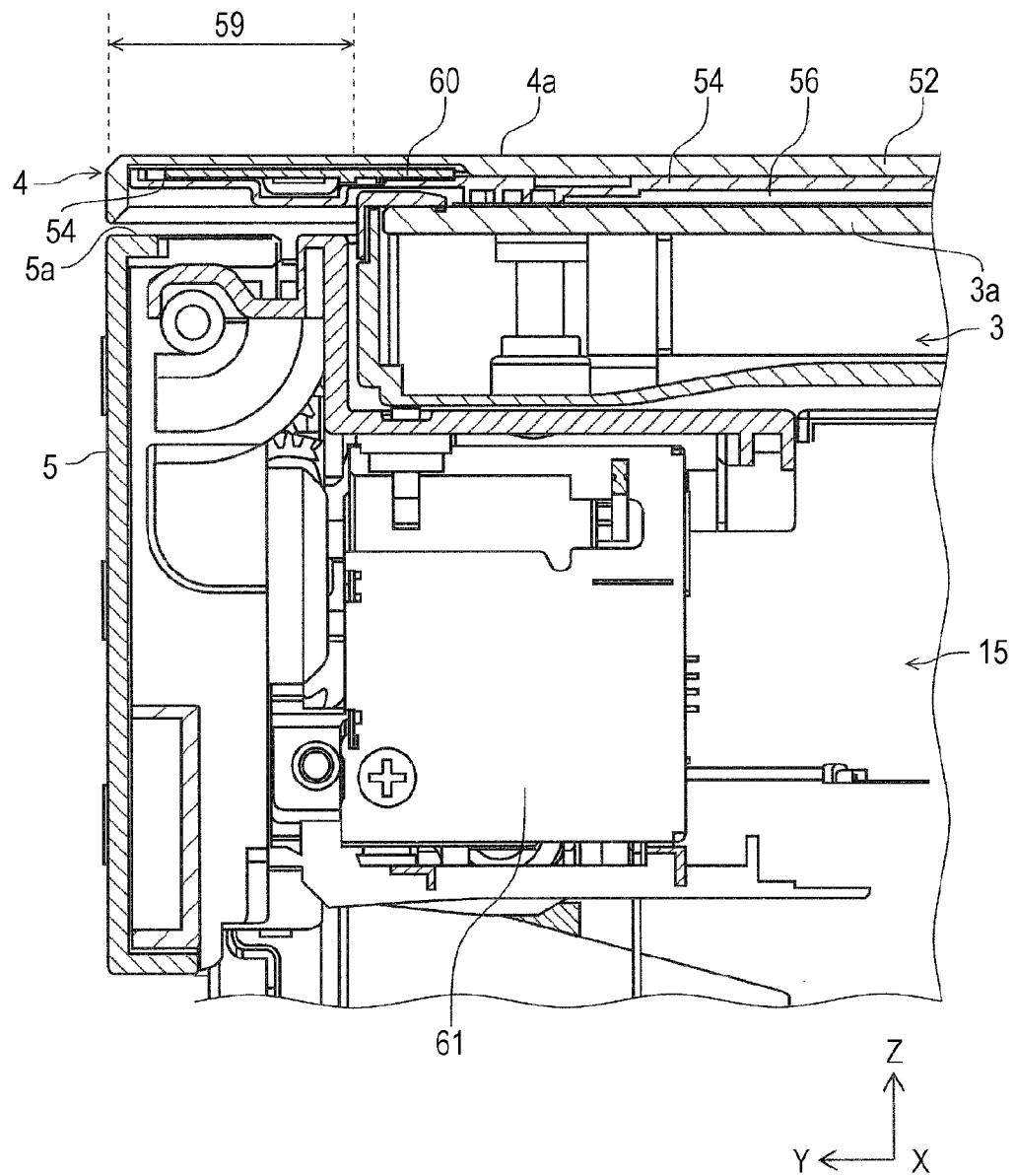
FIG. 10 is a sectional view of main portions of the printer according to the invention.
Figure 11:
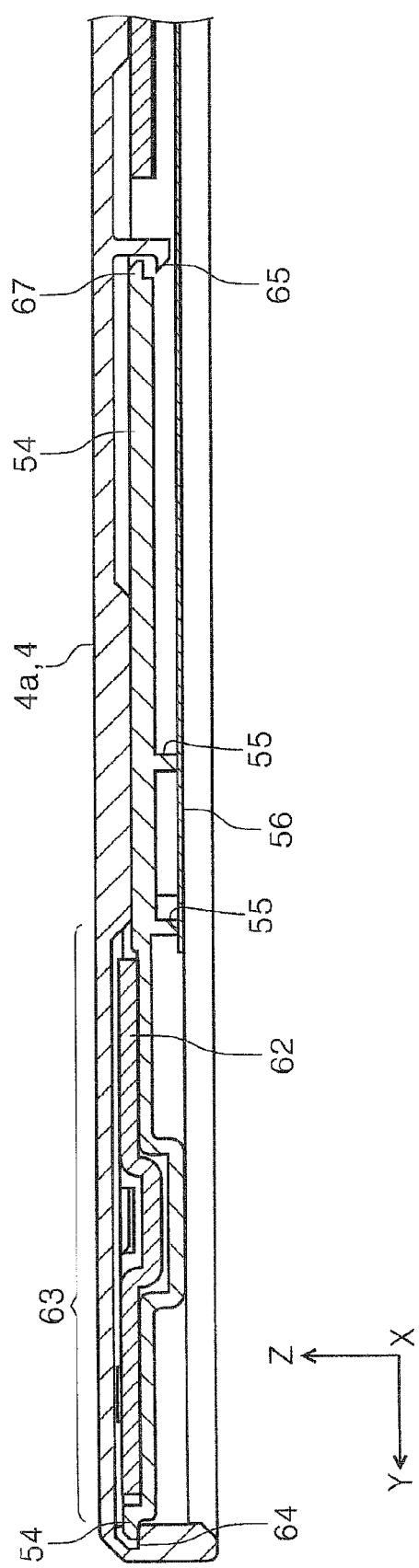
FIG. 11 is a sectional view of the main portions taken along an arrow XI-XI of FIG. 8.

FIG. 1 is an external perspective view of the printer according to the invention. FIG. 2 is a view illustrating a printer paper transporting path according to the invention. FIG. 3 is a perspective view illustrating a state where a cover of a reading mechanism portion is open in the printer according to the invention. FIG. 4 is a perspective view illustrating a state where the cover of the reading mechanism portion is removed. FIG. 5 is a perspective view illustrating a state where the reading mechanism portion is open with respect to a recording mechanism portion main body in the printer according to the invention. FIG. 6 is an exploded perspective view of the cover of the reading mechanism portion. FIG. 7 is a bottom view of a cover main body which configures the cover. FIG. 8 is a perspective view illustrating a state where an auxiliary cover is attached to the cover main body. FIG. 9 is a schematic plan view of the reading mechanism portion. FIG. 10 is a sectional view of main portions of the printer according to invention. FIG. 11 is a sectional view of main portions taken along an arrow XI-XI of FIG. 8.

Entire Configuration of Printer

Hereinafter, the entire configuration of a printer 1 will be schematically described.

The printer 1 (FIG. 1) according to the invention includes: a recording mechanism portion 15 configured of a recording head 30 (refer to FIG. 2) which serves as a recording unit that performs ink jet recording on a paper sheet which is an example of a recording medium in a recording mechanism portion main body 2; and a reading mechanism portion 3 (FIGS. 2 and 3) which is provided in an upper portion of the recording mechanism portion main body 2 and reads a document. In other words, the printer 1 is configured as a multifunction machine having a function of a scanner in addition to a function of ink jet recording.

Furthermore, in an X-Y-Z coordinate system illustrated in each drawing, the X direction is the scanning direction of a recording head, and the Y direction is the apparatus depth direction. The Z direction is the gravitational direction, and indicates the apparatus height direction. In addition, a +Y direction side is an apparatus front surface side, and a −Y direction side is an apparatus rear surface side. In addition, a right side when viewed from the apparatus front surface side is +X direction, and a left side is the −X direction. In addition, the +Z direction is an upper part of the apparatus (including an upper portion, an upper surface or the like), and the −Z direction side is a lower part of the apparatus (including a lower portion, a lower surface or the like).

In addition, hereinafter, the transport direction (+Y direction side) in which the paper sheet is transported in the printer 1 is referred to as a "downstream side", and the direction (−Y direction) opposite thereto is referred to as an "upstream side".

The reading mechanism portion 3 is provided to be rotatable with respect to the recording mechanism portion main body 2 of the recording mechanism portion 15, and by rotating, a state (FIG. 1) where the upper portion of the recording mechanism portion 15 is closed and a state (FIG. 5) where the recording mechanism portion 15 is open, can be obtained.

Furthermore, the reading mechanism portion 3 includes a cover 4 (FIGS. 1 and 3) which is openable and closable in an upper portion thereof, and the cover 4 is configured to open and close a document stand 3a (FIG. 3). A configuration of the reading mechanism portion 3 including a configuration of the cover 4 will be described later in detail.

On the apparatus front surface of the printer 1 of FIG. 1, a reference numeral 5 is an operation panel 5 including a power source button, an operation button which performs various types of printing setting and recording, and a display portion which performs preview display of printing setting contents or printing image.

In addition, on the apparatus front surface, a reference numeral 9 is an openable and closable cover which is provided on a lower step side tray 13 (FIG. 2). In addition, as illustrated in FIG. 2, by opening a cover 9, the lower step side tray 13, an upper step side tray 14, and a paper discharge receiving tray 8 are configured to be exposed.

The paper discharge receiving tray 8 is provided to obtain a state (FIG. 1) of being accommodated in the recording mechanism portion main body 2 by a motor which is not illustrated, and a state (FIG. 2) of protruding to the front side of the recording mechanism portion main body 2, and by achieving the state of protruding to the front side of the recording mechanism portion main body 2, it is possible to receive the paper sheet discharged by performing the recording.

The lower step side tray 13 illustrated in FIG. 2 and the upper step side tray 14 provided in the upper portion thereof can accommodate a plurality of paper sheets, and each of the lower step side tray 13 and the upper step side tray 14 is independent from each other, and is attachable to and detachable from the recording mechanism portion main body 2. In addition, even when one side is in a state where the paper sheet is not mounted yet, when the other side is in a state where the paper sheet is mounted, the paper sheet can be sent out from the tray on which the paper sheet is mounted.

In addition, in a rear upper portion of the recording mechanism portion main body 2, a reference numeral 6 is an openable and closable manual feed cover, and by opening the manual feed cover 6 as illustrated in FIG. 2, the paper supply is performed by manual paper supply in which a manual feed tray 7 is used.

Furthermore, the paper transporting path in the recording mechanism portion 15 of the printer 1 will be described later.

Configuration of Reading Mechanism Portion (1) Regarding Entire Configuration of Reading Mechanism Portion As described above, in the upper portion of the recording mechanism portion 15, the reading mechanism portion 3 is linked to be rotatable to the recording mechanism portion main body 2 of the recording mechanism portion 15, and as the reading mechanism portion 3 rotates, the upper portion of the recording mechanism portion 15 is opened and closed (FIG. 5).

More specifically, the reading mechanism portion 3 is linked to be rotatable to the recording mechanism portion 15 in a first linking portion 35 and a second linking portion 36 which are illustrated in FIG. 4. Rotation shafts 35a and 36a are provided in each of the first linking portion 35 and the second linking portion 36, the rotation shafts 35a and 36a are pivotally supported around a bearing which is not illustrated and is provided on the recording mechanism portion main body 2 side, and the reading mechanism portion 3 rotates to open and close the upper portion of the recording mechanism portion 15.

Furthermore, in the example, the first linking portion 35 and the second linking portion 36 are provided to be integrated with a housing 40 which serves as a "main body portion" of the reading mechanism portion 3.

As illustrated in FIG. 4, the reading mechanism portion 3 is provided with the document stand 3a, and an upper surface of the document stand 3a becomes a document loading surface on which the document is placed. The document stand 3a is a transparent glass plate in the example. The periphery of the document stand 3a is configured of a plurality of frames 33a, 33b, 33c, and 33d, and a rectangular region divided by the frames 33a, 33b, 33c, and 33d becomes a document reading region which can perform reading by a reading unit 37 which moves in the housing 40.

In other words, in the example, the reading mechanism portion 3 is a flat-bed type scanner, and on a lower side of the document stand 3a, the reading unit 37 is provided to be movable relatively to the document stand 3a. Furthermore, in the embodiment, the plurality of frames 33a, 33b, 33c, and 33d are configured, but may be configured to be integrated.

The reading unit 37 is provided in the housing 40, extends in the main scanning direction (Y-axis direction), and the reading unit 37 is configured of a moving mechanism 43 which will be described later to be movable in the auxiliary scanning direction (X-axis direction) intersecting with the main scanning direction. Furthermore, in the example, the main scanning direction corresponds to the short side direction (Y-axis direction) of the document reading region, and the auxiliary scanning direction corresponds to a long side direction (X-axis direction) of the document reading region.

The reading unit 37 (refer to FIG. 9) moves to a position on a −X side from a home position (a position of the reading unit 37 illustrated by a two-dot chain line in FIG. 9) positioned on a +X side, in the moving direction (X-axis direction). Therefore, the rectangular region illustrated by one-dot chain line with a reference numeral 38 is a moving region 38 of the reading unit 37.

The reading unit 37 is provided with a reading sensor (not illustrated). The reading sensor is an optical sensor which is provided with a light source and a light receiving portion which are not illustrated, emits light from the light source to the document placed on the document stand 3a, receives the reflected light from the document by the light receiving portion, and reads the information of the document. For example, it is possible to use a charge coupled devices (CCD) type or a contact image sensor (CIS) type optical sensor.

(2) Regarding Cover of Reading Mechanism Portion

Next, the cover 4 which opens and closes the document stand 3a provided in the upper portion of the reading mechanism portion 3, will be described.

The cover 4 is configured so that a rotation shaft 57 (FIGS. 3 and 6) provided in a cover main body 52 which forms an upper surface of the cover 4 is attached to a bearing portion 58 (FIG. 9) provided on the housing 40 side, and rotates considering the X-axis direction as a rotation shaft.

In other words, the cover 4 is provided to be capable of opening and closing the document stand 3a by rotating around the rotation shaft 57 provided in an end portion in the Y-axis direction intersecting with the X-axis direction that becomes the moving direction of the reading unit 37.

As illustrated in FIG. 6, the cover 4 includes the cover main body 52, an auxiliary cover 54 attached to a lower part (−Z direction) of the cover main body 52, and a document pressing mat 56 attached to a lower part of the auxiliary cover 54.

In addition, when closing the cover 4, the document placed on the document stand 3a is pressed by the document pressing mat 56, and the reading surface tightly adheres to the document stand 3a.

When the printer 1 is viewed in a plan view, the cover 4 covers the document stand 3a of the reading mechanism portion 3, and being hooked to an upper portion 5a (FIGS. 3 and 9) of the operation panel 5 provided on the front surface side of the printer 1, also covers the upper portion 5a.

Furthermore, on a free end side (+Y side) of the cover main body 52 illustrated in FIGS. 7 and 10, the region illustrated by a reference numeral 59 is a part of being hooked to the upper portion 5a of the operation panel 5 in a state where the cover 4 is closed. In FIG. 10, a reference numeral 61 is a power source for driving a configuration element that becomes a driving target, such as the recording head 30, in the recording mechanism portion 15.

In addition, in the cover 4, a near field communication unit 60 (hereinafter, there is a case of being referred to as an NFC interface 60) is provided.

As the printer 1 is provided with the NFC interface 60, for example, it is possible to perform near field communication between the printer 1 and a portable terminal of a user, to set the printer 1 for sending information to and from the portable terminal, to transfer image data, to perform the recording in the recording mechanism portion 15, and to perform scanning in the reading mechanism portion 3.

In addition, as the NFC interface 60 is provided in the cover 4 which opens and closes the document stand 3a, since the user can easily put the communication machine of the portable terminal or the like from the upper part of the printer 1, the operability is improved.

In addition, in the example, the NFC interface 60 is provided on the outside of a region which overlaps the moving region 38 (FIG. 9) of the reading unit 37 in a state where the cover 4 is closed.

In the example, the NFC interface 60 is provided on the free end side (a position separated from the rotation shaft 57 in the +Y direction) of the opening and closing cover 4 (FIGS. 7 and 9), and is provided at a position of being hooked to the upper portion 5a of the operation panel 5 in a state where the cover 4 is closed.

In the reading unit 37, for example, there is a case where a plate metal is used in a sensor carriage or the like for holding the reading sensor. When there is a metal material, such as the plate metal, near the NFC interface 60, there is a case where the near field communication is damaged.

In the example, as the cover 4 includes the NFC interface 60 on the outside of the region that overlaps the moving region 38 of the reading unit 37 in a closed state, it is possible to suppress defects that cause damage to the near field communication due to the reading unit 37, and it is possible to perform excellent communication.

In addition, since the NFC interface 60 is provided at a position of being hooked to the upper portion 5a of the operation panel 5 in a state where the cover 4 is closed, the operation part is settled at one location by the user, and compared to a configuration in which the NFC interface 60 is disposed in a place separated from the operation panel 5, the operability of the user is improved.

In addition, as illustrated in FIG. 6, the NFC interface 60 is provided to be nipped between the cover main body 52 and the auxiliary cover 54. In other words, the NFC interface 60 is covered and is not exposed by the cover main body 52 and the auxiliary cover 54.

In this manner, by the configuration, it is possible to protect the NFC interface 60 by the auxiliary cover 54. In addition, the rigidity of the cover 4 is also improved by overlapping two members, such as the cover main body 52 and the auxiliary cover 54, each other.

Next, on the free end side (+Y side) of the cover 4, between the auxiliary cover 54 and the cover main body 52, and in a region other than the region provided with the NFC interface 60, a metal plate 62 (FIG. 6) is provided.

In other words, as illustrated in FIG. 7, the metal plate 62 is provided between the auxiliary cover 54 and the cover main body 52, and in the region other that avoids the NFC interface 60. Furthermore, in other words, the NFC interface 60 is provided in a region shifted from a disposition region of the metal plate 62.

By providing the metal plate 62 between the auxiliary cover 54 and the cover main body 52, the rigidity of the cover 4 is more improved. Additionally, since the metal plate 62 is provided in the region that avoids the NFC interface 60, the metal plate 62 can suppress defects that cause damage to the near field communication.

Furthermore, it is desirable that the metal plate 62 is in the region that avoids the NFC interface 60, but the NFC interface 60 can also be disposed between the cover main body 52 and the metal plate 62.

In the cover 4, a thin portion 63 is formed along the moving direction of the reading unit 37 on the outside of the region which overlaps the moving region 38 of the reading unit 37 in a state where the cover 4 is closed at a position at which the NFC interface 60 and the metal plate 62 are provided, that is, on the free end side of the cover main body 52.

More specifically, as illustrated in FIG. 11, the thin portion 63 is configured to be flush with an upper surface 4a of the cover 4 (cover main body 52) that configures an exterior of the printer 1, and to be formed to be thin so that a rear surface thereof becomes a recess portion.

In addition, the metal plate 62 and the NFC interface 60 are disposed in the thin portion 63 (FIG. 7).

According to this, it is possible to suppress an increase in thickness of the cover 4 in accordance with the disposition of the metal plate 62 and the NFC interface 60.

Furthermore, the metal plate 62 and the NFC interface 60, for example, remain in the cover main body 52 as projection portions 68 and 69 (FIG. 7) provided on the cover main body 52 side, are bonded to hole portions which are not illustrated and are provided in the metal plate 62 and the NFC interface 60.

Next, bonding between the cover main body 52 and the auxiliary cover 54 will be described.

The cover main body 52 and the auxiliary cover 54 are bonded to each other as engagement portions (reference numerals 64 and 65 in FIGS. 7 and 11) provided on the cover main body 52 side and engaged portions (reference numerals 66 and 67 in FIGS. 6 and 11) provided on the auxiliary cover 54 side, are respectively engaged with each other.

More specifically, on the cover main body 52 side, the circumferential edge engagement portion 64 provided at an circumferential edge of the cover main body 52, and the inner side engagement portion 65 provided on the inner side of the cover main body 52, are provided, and on the auxiliary cover 54 side, the circumferential edge engaged portion 66 which is engaged with the circumferential edge engagement portion 64 and the inner side engaged portion 67 which is engaged with the inner side engagement portion 65 are provided.

As illustrated in FIG. 11, the circumferential edge engagement portion 64 and the inner side engagement portion 65 in the cover main body 52 are at a shifted position in the apparatus height direction (Z-axis direction), and the inner side engaged portion 67 which is engaged with the inner side engagement portion 65 can move in the apparatus height direction. According to this, the cover main body 52 and the auxiliary cover 54 are bonded to each other in a state where "play" is provided.

As the play is provided in the bonding portion between the cover main body 52 and the auxiliary cover 54, when the cover main body 52 and the auxiliary cover 54 are bonded to each other, it is possible to make it difficult to receive influence of accuracy of components opposite to each other. For example, even when there is a curve in one of the cover main body 52 and the auxiliary cover 54, as there is the play in the bonding portion, it is possible to avoid generation of a curve as the entire cover 4 when both are bonded to each other.

On the lower surface (−Z side) of the auxiliary cover 54, a plurality of ribs 55 which extend in the long side direction (X-axis direction) and in the short-side direction (Y-axis direction) of the auxiliary cover 54, are provided.

As the ribs 55 are provided, it is possible to more reliably press the document on the document stand 3a by the document pressing mat 56.

Furthermore, in the example, a configuration in which the NFC interface 60 is provided between the cover main body 52 and the auxiliary cover 54 is employed, but it is also possible to nip the NFC interface 60 between the cover main body 52 and the document pressing mat 56 without providing the auxiliary cover 54.

In a case where the auxiliary cover 54 is not provided, it is preferable that ribs which correspond to the plurality of ribs 55 of the auxiliary cover 54 be provided in the cover main body 52. When the ribs are present, it is possible to accommodate the NFC interface 60 in the height of the rib, and to reduce the influence of the thickness of the NFC interface 60 in the apparatus height direction.

(3) Regarding Moving Mechanism of Reading Unit

The reading unit 37 (FIG. 9) is configured to be driven by the moving mechanism 43 by driving a belt, to be engaged with a sliding portion which is not illustrated and is provided in the lower portion of the reading unit 37 to be movable, to be guided to a guide portion 42, and to move in the auxiliary scanning direction (X-axis direction) by driving a motor 44 which serves as a power source that moves the reading unit 37.

As illustrated in FIG. 9, the moving mechanism 43 of the reading unit 37 includes a driving pulley 45 driven by the motor 44, two driven pulleys 46 which can be rotated to be driven by the driving pulley 45, a driven pulley 47, a driving pulley 45, a driven pulley 46, and an endless belt 48 which is engaged and rotates between the driven pulley 47 and the endless belt 48.

The driven pulley 46 and the driven pulley 47 are disposed in the vicinity of the end portion on one side of the guide portion 42, and in the vicinity of the end portion on the other side. In addition, the motor 44 of the driving pulley 45 is disposed in the first linking portion 35 in which the rotation shaft 35a of the reading mechanism portion 3 is provided.

Furthermore, a reference numeral 49 is a biasing portion which applies tension to the endless belt 48. The biasing portion 49 can also be provided between the driving pulley 45 and the driven pulley 47 or between the driven pulley 46 and the driven pulley 47, other than a space between the driving pulley 45 and the driven pulley 46.

A configuration in which the reading unit 37 is fixed to the endless belt 48 at a part along the guide portion 42 in the endless belt 48, that is, at the position between the driven pulley 46 and the driven pulley 47, the endless belt 48 rotates by driving the motor 44, and a sensor carriage 41 reciprocates in the X-axis direction being attracted to the endless belt 48, is achieved. By the configuration, since the reading unit 37 is attracted by the endless belt 48 provided to be close to the guide portion 42, it is possible to smoothly move the reading unit 37.

Example 2

Figure 12:
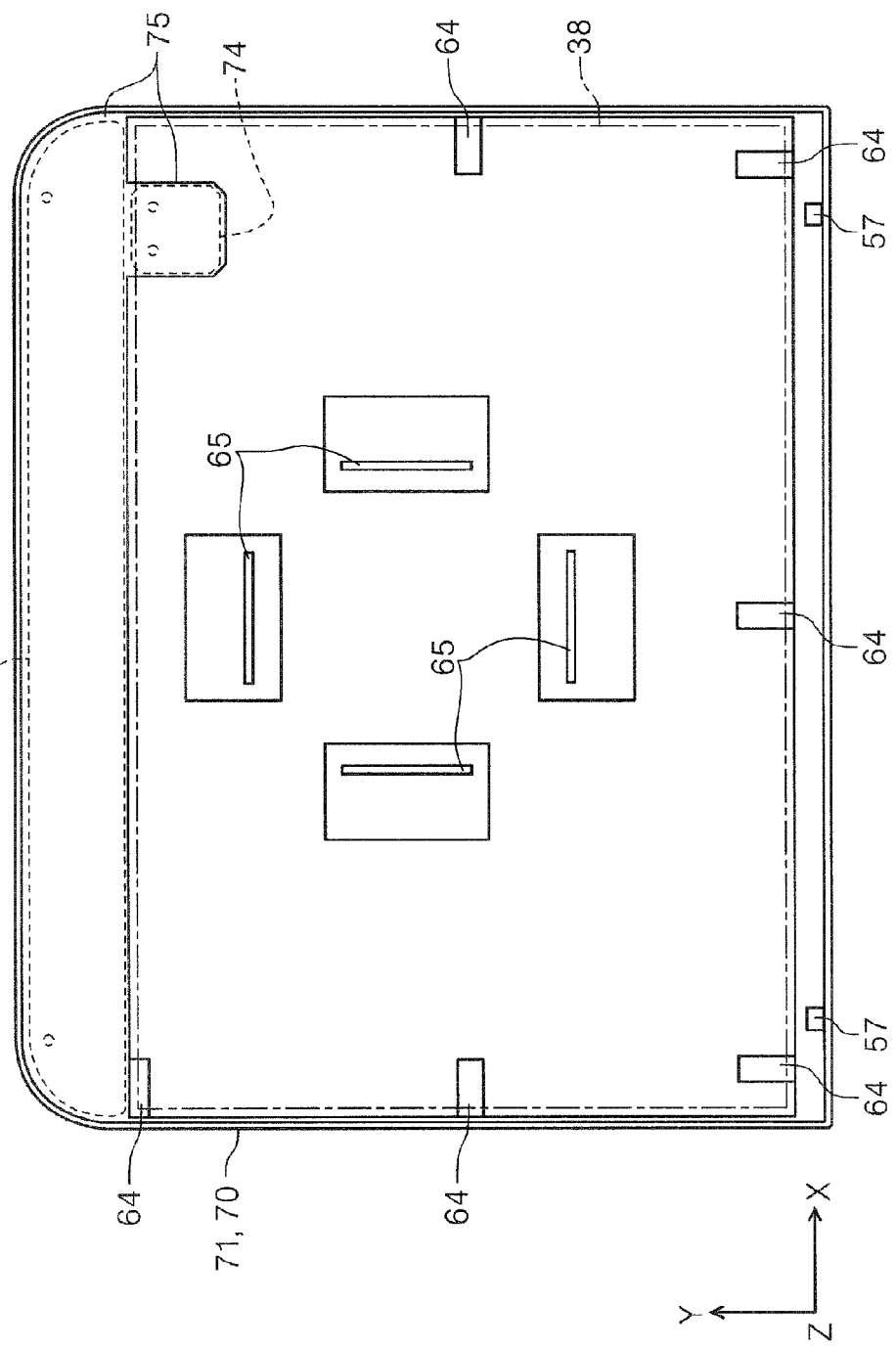
FIG. 12 is a bottom view of a cover main body which configures a cover according to Example 2.
Figure 13:
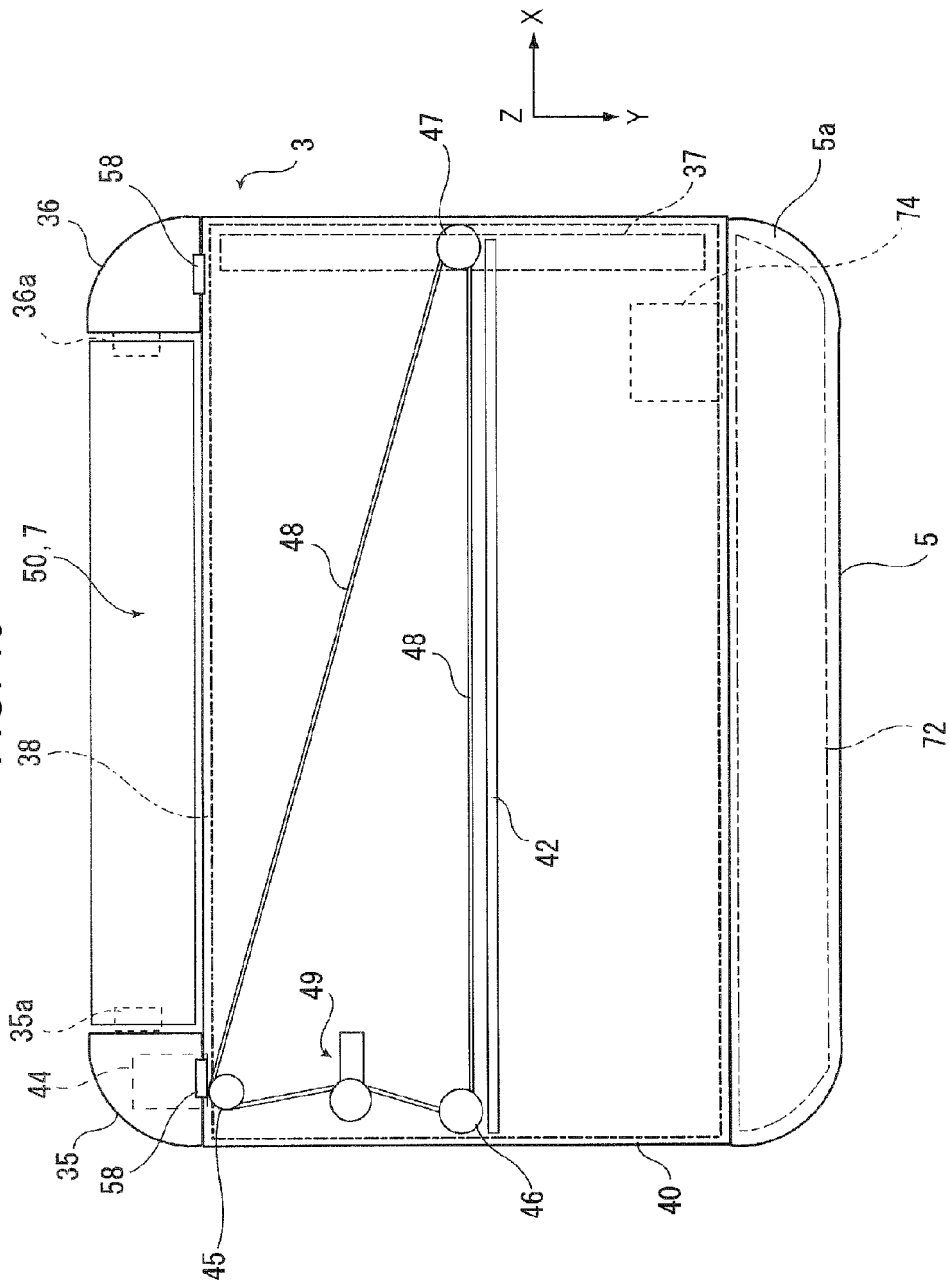
FIG. 13 is a schematic plan view of a reading mechanism portion according to Example 2.
Figure 14:
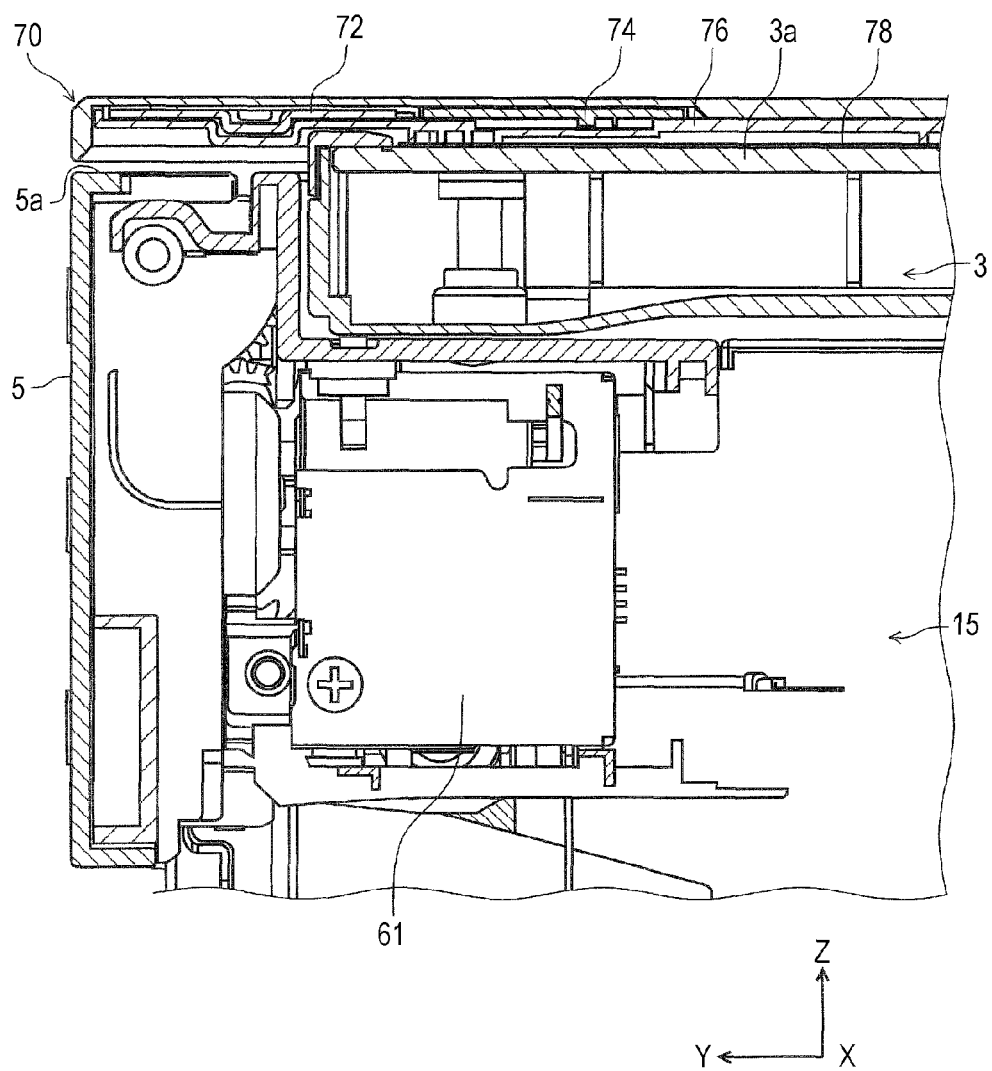
FIG. 14 is a sectional view of main portions of a printer according to Example 2.

In Example 2, based on FIGS. 12 to 14, another example of the cover of the reading mechanism portion will be described. FIG. 12 is a bottom view of the cover main body which configures the cover according to Example 2. FIG. 13 is a plan view of the reading mechanism portion according to Example 2. FIG. 14 is a sectional view of main portions of the printer according to Example 2.

In the embodiment, configuration elements the same as those of Example 1 will be given the same reference numerals, and the description thereof will be omitted.

In the example, a cover 70 (FIG. 12) which opens and closes the upper portion of the reading mechanism portion 3 includes a metal plate 72 and a near field communication unit 74 (hereinafter, referred to as the NFC interface 74).

More specifically, the metal plate 72 extends across substantially the entire region in the apparatus width direction (X-axis direction) on the free end side (+Y side) of a cover main body 71 that configures the cover 70.

In addition, with reference to FIGS. 13 and 14, the NFC interface 74 is provided in the region which overlaps the moving region 38 (FIG. 13) of the reading unit 37 in a state where the cover 70 is closed (FIG. 14), and at the position shifted from the home position (the position of the reading unit 37 in FIG. 13) of the reading unit 37.

Furthermore, similar to Example 1, the metal plate 72 and the NFC interface 74 are disposed in a thin portion 75 (FIG. 12) formed in the cover main body 71.

In addition, as illustrated in FIG. 14, the recording mechanism portion 15 includes the power source 61 which serves as the power source portion that supplies power when driving the driving target including the recording head 30, and in the example, the NFC interface 74 is positioned above the power source 61 in a state where the cover 70 is closed. Furthermore, in FIG. 14, a reference numeral 76 is an auxiliary cover, and a reference numeral 78 is a document pressing mat.

In the example, in the cover 70, since the NFC interface 74 is provided in the region shifted from the disposition region of the metal plate 72, it is also possible to suppress defects that cause damage to the near field communication due to metal plate 72. In addition, the rigidity of the cover 70 is improved by the metal plate 72.

In the example, being different from Example 1, the NFC interface 74 is in the region which overlaps the moving region 38 of the reading unit 37 in a state where the cover 70 is closed, but since the NFC interface 74 is provided at a position (refer to FIG. 13) shifted from the home position of the reading unit 37, a state where the NFC interface 74 and the reading unit 37 are separated from each other is likely to be achieved when the near field communication is performed, and accordingly, it is possible to suppress defects that cause damage to the near field communication due to the reading unit 37, and to perform excellent communication.

Regarding Another Configuration in Cover of Reading Mechanism Portion

With reference to FIGS. 15 to 25, a configuration of the auxiliary cover that configures the cover of the reading mechanism portion will be described.

Figure 15:
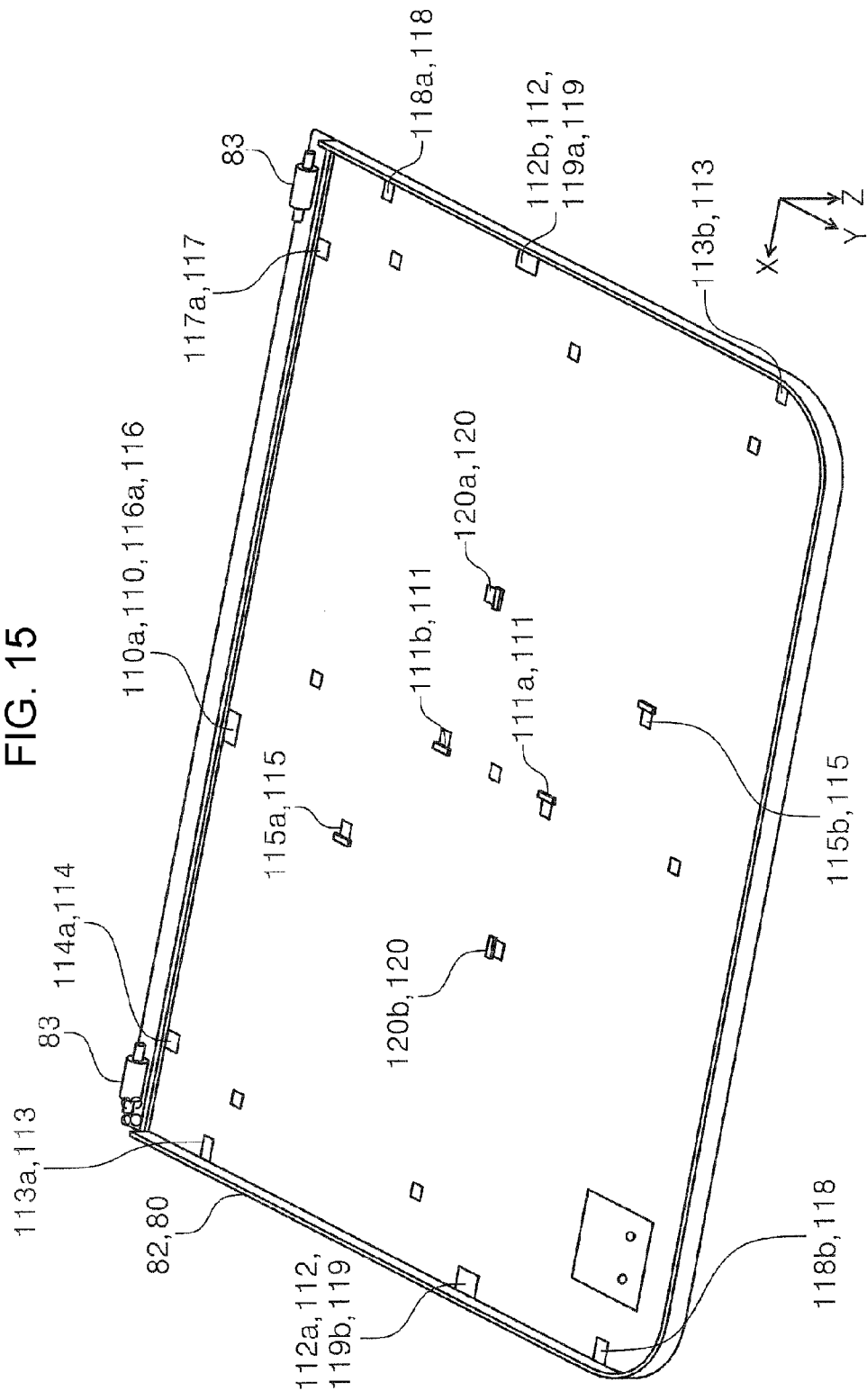
FIG. 15 is a perspective view of the cover main body.
Figure 16:
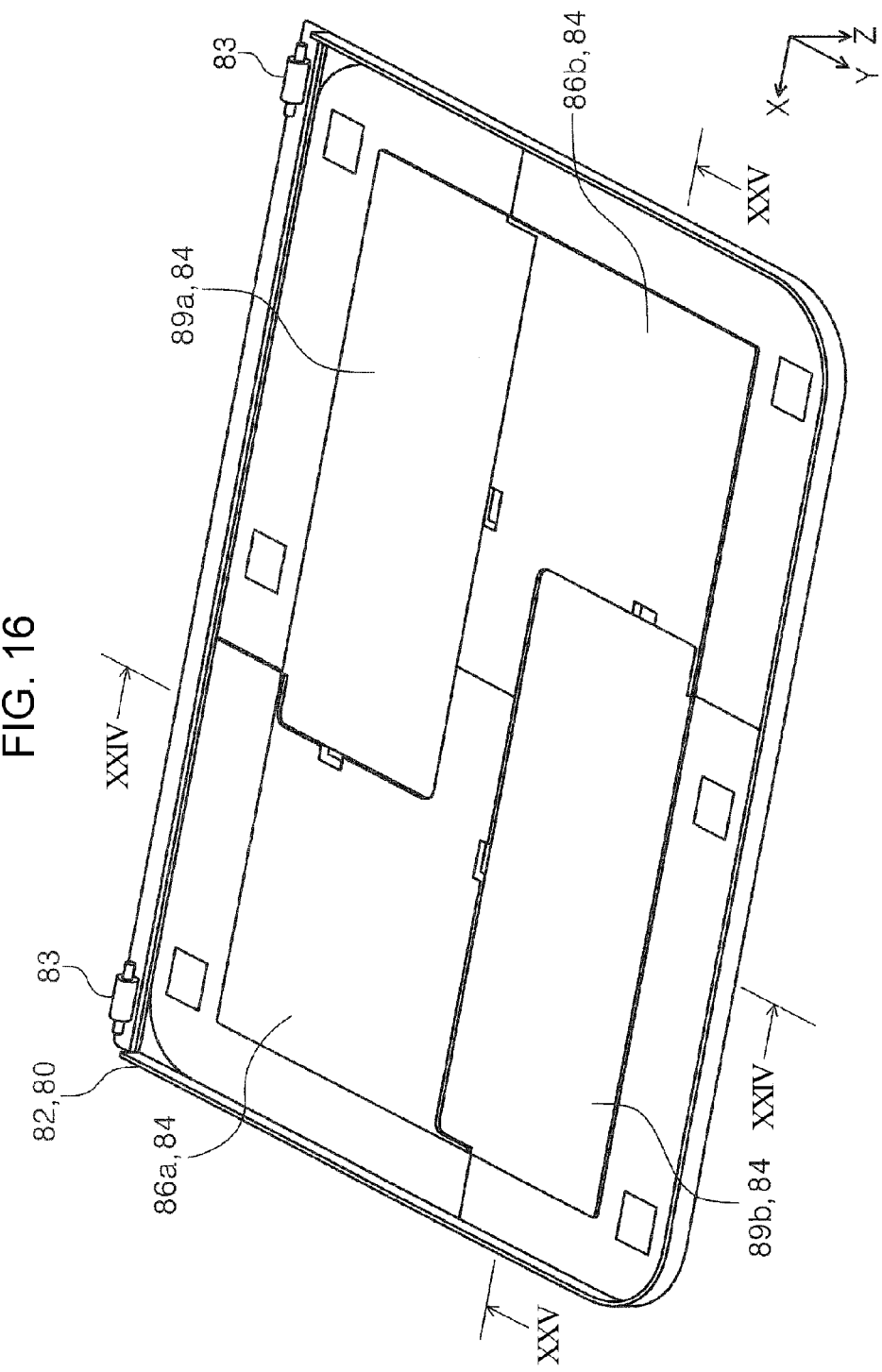
FIG. 16 is a perspective view illustrating a state where the auxiliary cover is attached to the cover main body.
Figure 19:
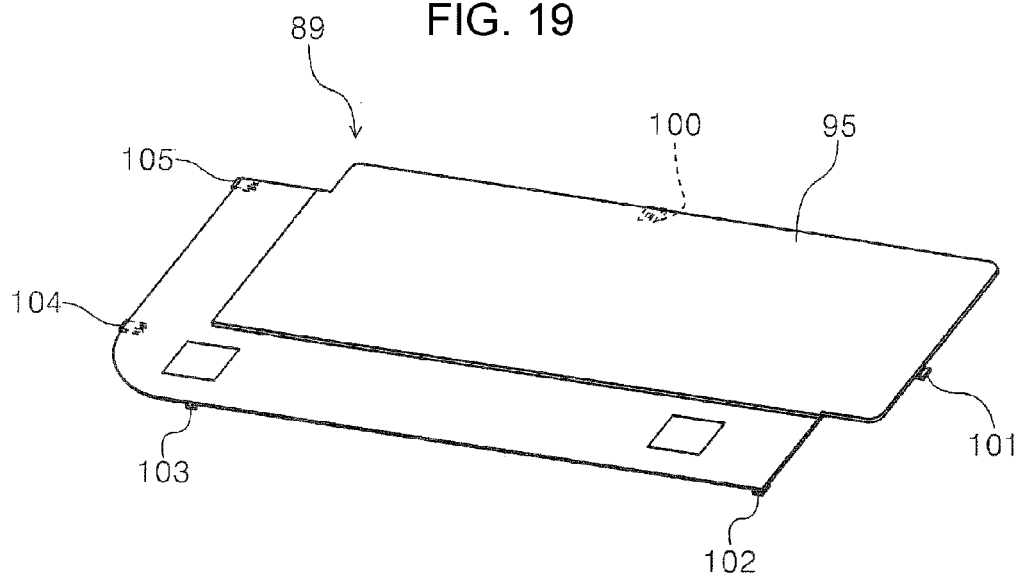
FIG. 19 is a perspective view of second parts which configure the auxiliary cover illustrated in FIG. 16.
Figure 20:
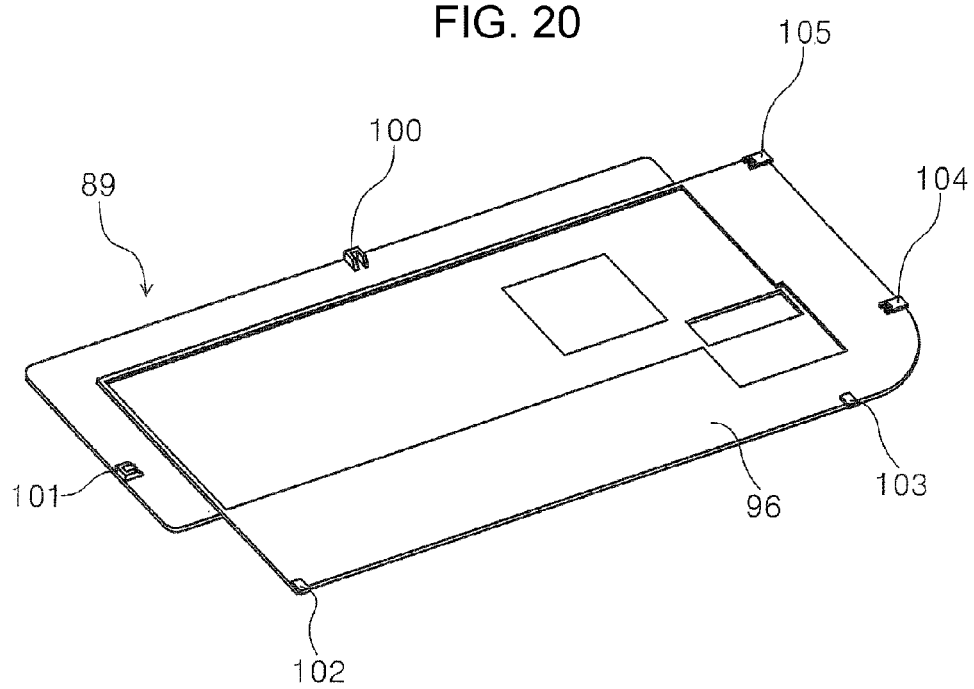
FIG. 20 is a perspective view when the second parts illustrated in FIG. 19 are viewed from a rear surface.
Figure 21:
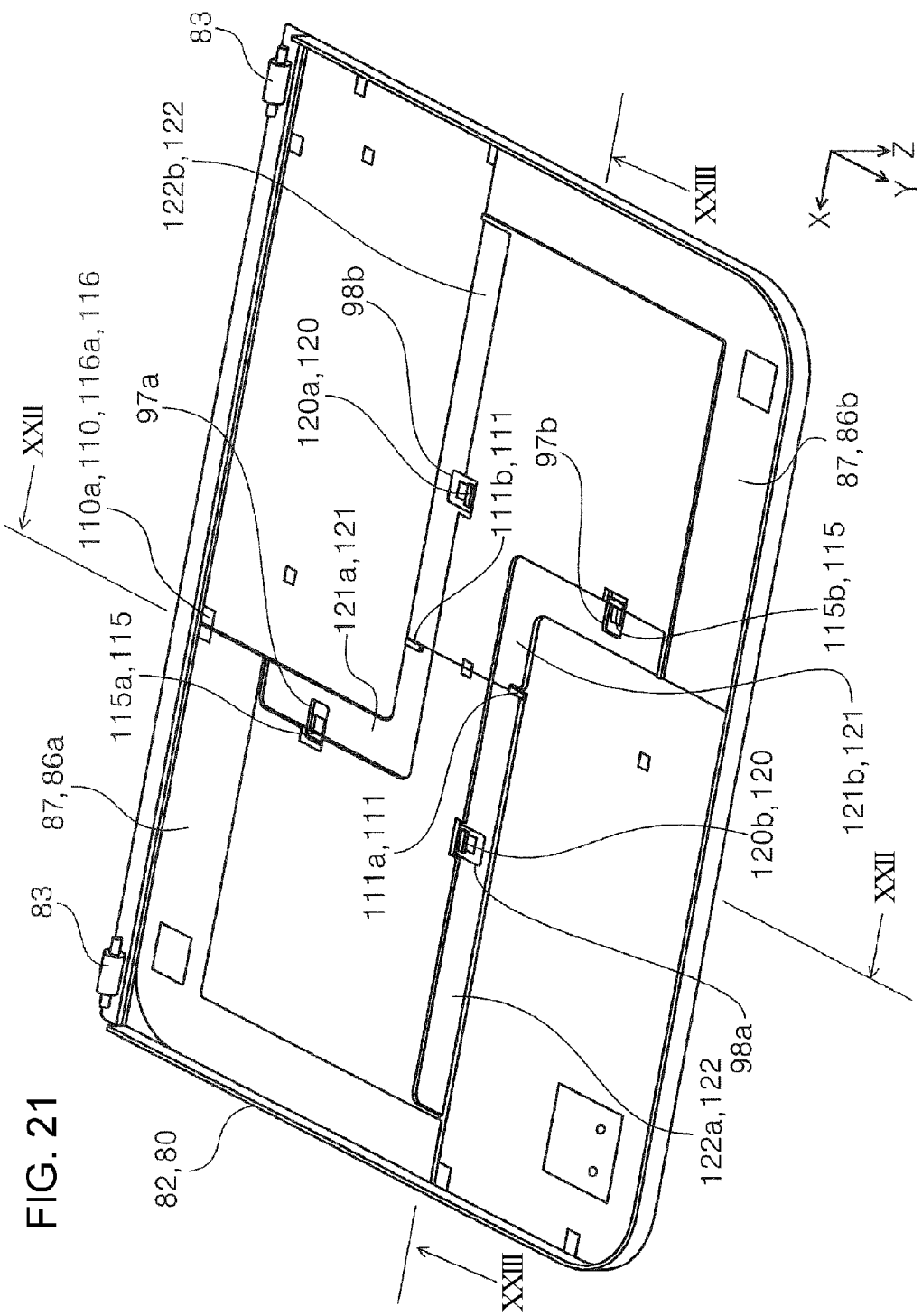
FIG. 21 is a perspective view illustrating a state where the first parts are attached to the cover main body.
Figure 22:
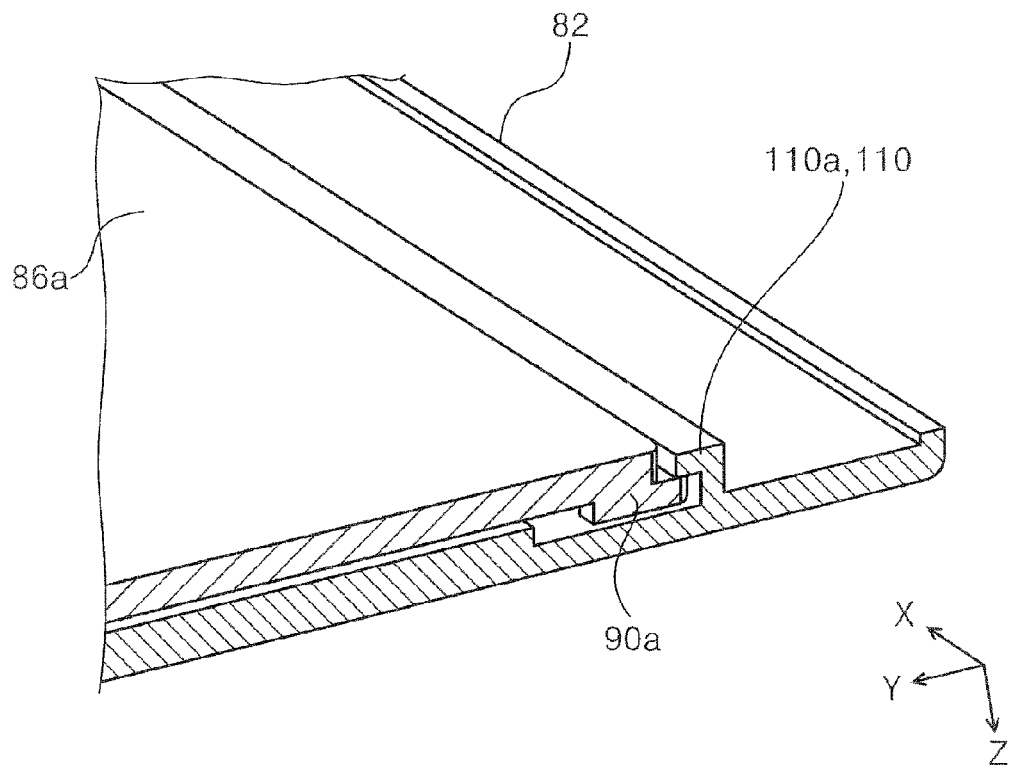
FIG. 22 is a sectional view of main portions taken along an arrow XXII-XXII of FIG. 21.
Figure 23:
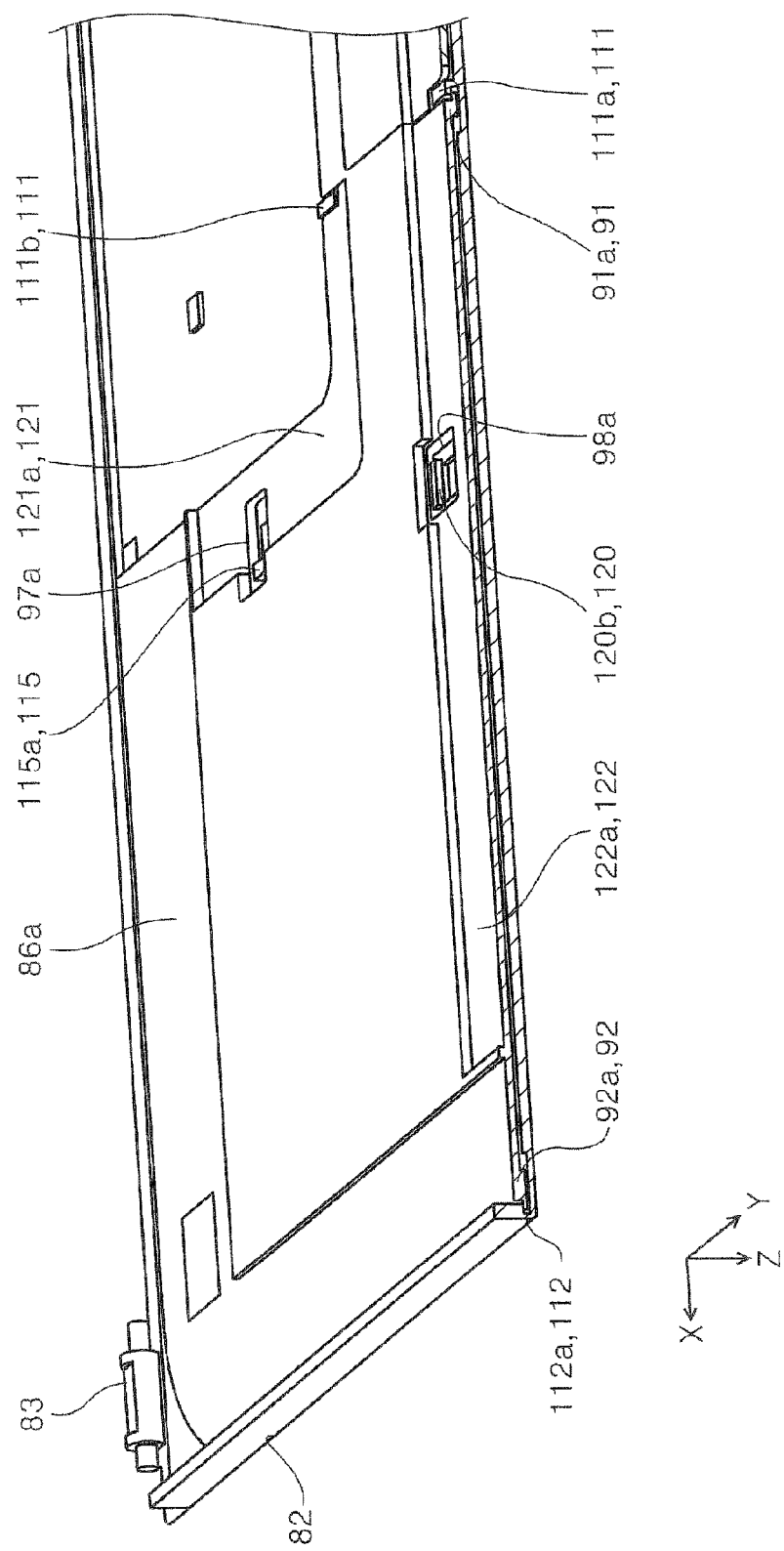
FIG. 23 is a sectional view of main portions taken along an arrow XXIII-XXIII of FIG. 21.
Figure 24:
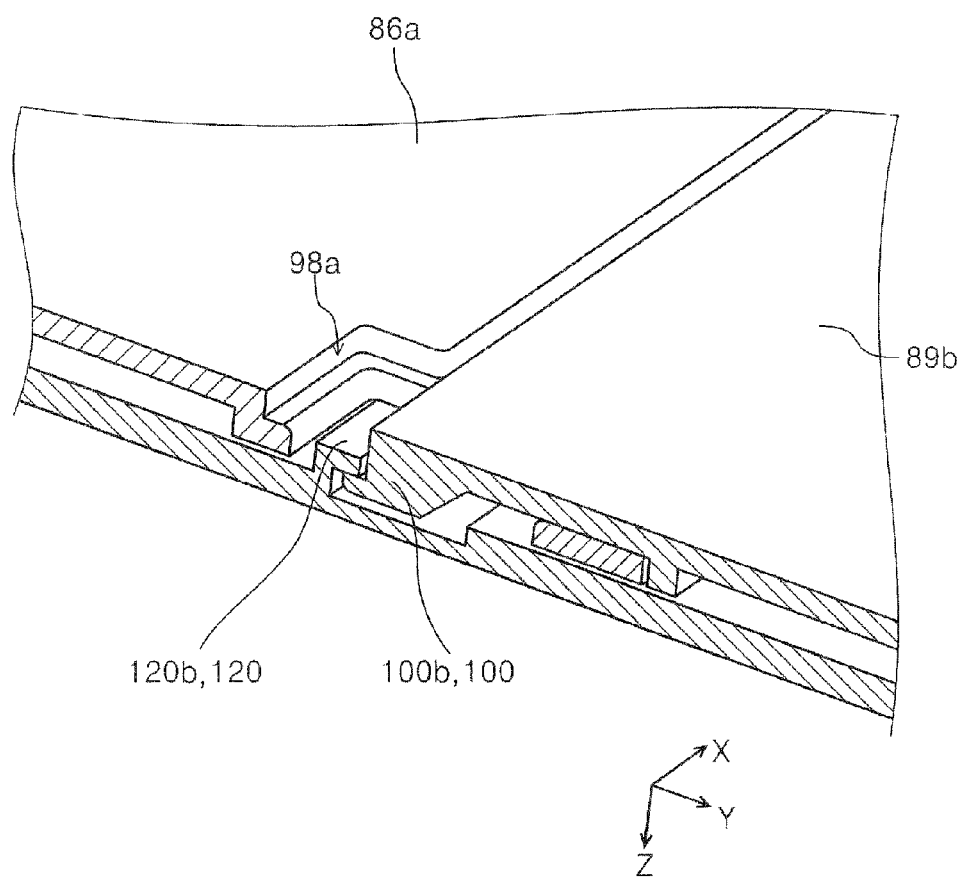
FIG. 24 is a sectional view of main portions taken along an arrow XXIV-XXIV of FIG. 16.
Figure 25:
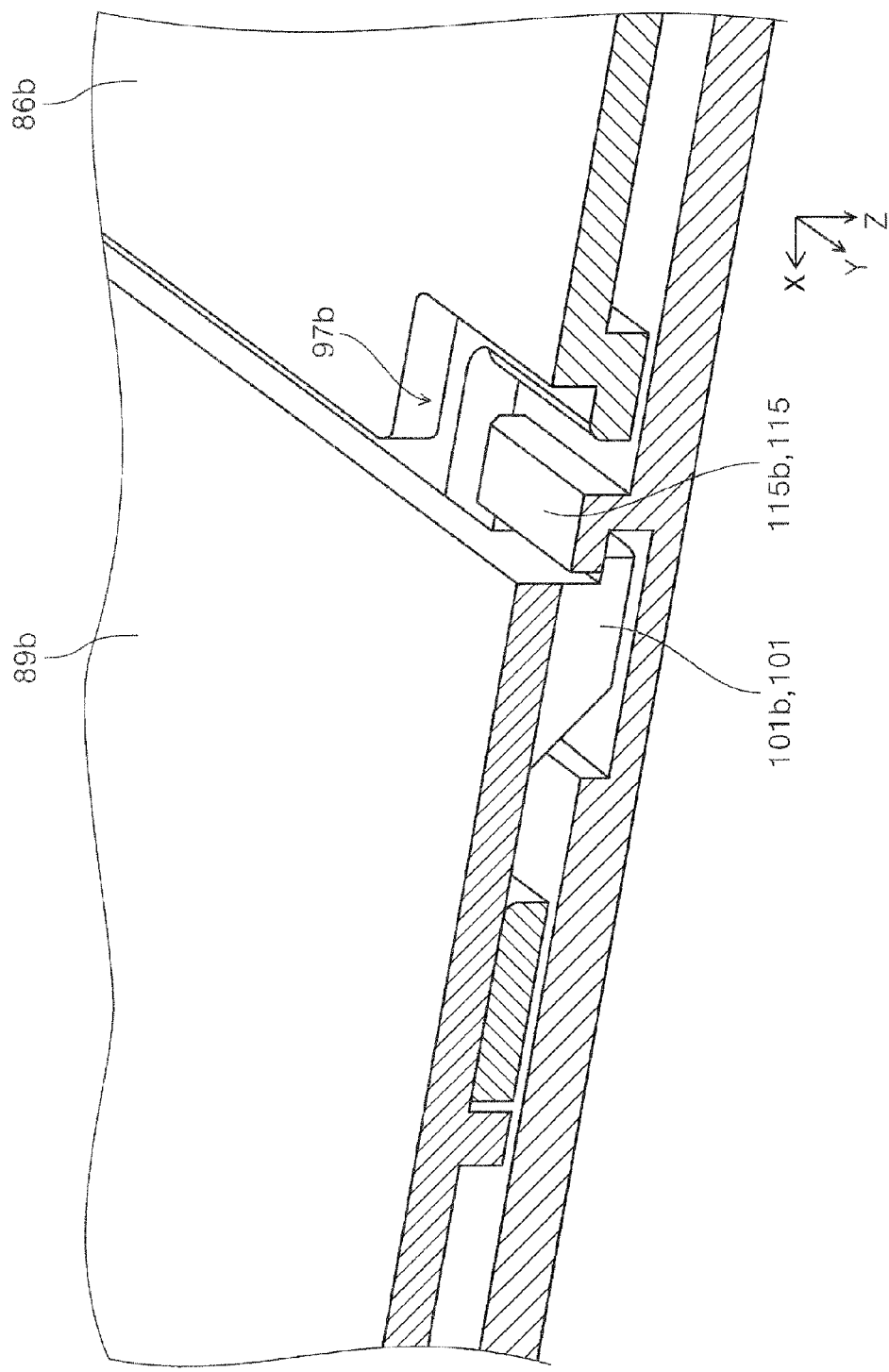
FIG. 25 is a sectional view of main portions taken along an arrow XXV-XXV of FIG. 16.

FIG. 15 is a perspective view of a cover main body. FIG. 16 is a perspective view illustrating a state where the auxiliary cover is attached to the cover main body. FIG. 17 is a perspective view of first parts which configure the auxiliary cover illustrated in FIG. 16. FIG. 18 is a perspective view when the first parts illustrated in FIG. 17 are viewed from a rear surface. FIG. 19 is a perspective view of second parts which configure the auxiliary cover illustrated in FIG. 16. FIG. 20 is a perspective view when the second parts illustrated in FIG. 19 are viewed from a rear surface. FIG. 21 is a perspective view illustrating a state where the first parts are attached to the cover main body. FIG. 22 is a sectional view of main portions taken along an arrow XXII-XXII of FIG. 21. FIG. 23 is a sectional view of main portions taken along an arrow XXIII-XXIII of FIG. 21. FIG. 24 is a sectional view of main portions taken along an arrow XXIV-XXIV of FIG. 16. FIG. 25 is a sectional view of main portions taken along an arrow XXV-XXV of FIG. 16.

For example, in Example 1, the cover 4 is configured to include the cover main body 52 and the auxiliary cover 54. By forming the cover 4 by two layers of the cover main body 52 and the auxiliary cover 54, the rigidity as a pressing plate of the document on the document stand 3a, is improved.

In addition to a case where the auxiliary cover 54 is formed as one plate-like body as illustrated in FIG. 6, the auxiliary cover 54 can be formed by a plurality of parts as will be described hereinafter.

A cover 80 which will be described hereinafter includes a cover main body 82 (FIG. 15) and an auxiliary cover 84 (FIG. 16) bonded to the cover main body 82. The auxiliary cover 84 is formed in a rectangular shape as illustrated in FIG. 16 by combining four parts in total including two first parts 86 (86a and 86b in FIG. 16) illustrated in FIGS. 17 and 18, and two second parts 89 (89a and 89b in FIG. 16) illustrated in FIGS. 19 and 20.

Furthermore, the reference number 83 in the cover main body 82 is a rotation shaft of the opening and closing cover 80 with respect to the document stand 3a (FIG. 3).

The first parts 86 (FIGS. 17 and 18) include claws 90, 91, 92, 93, and 94 which serve as engaged portions and are engaged with engagement portions 110, 111, 112, 113, and 114 (FIG. 15) which are provided on the cover main body 82 side. Furthermore, in the first parts 86, a surface 87 in FIG. 17 is disposed to be oriented toward a side opposing the document stand 3a, that is, in the −Z direction, and a surface 88 in FIG. 18 is disposed to be oriented toward the cover main body 82 side.

In addition, the first parts 86 include a first opening portion 97 and a second opening portion 98 for exposing engagement portions 115 and 120 which are engaged with the second parts 89 in the cover main body 82.

Furthermore, in the first parts 86, step difference portions 121 and 122 which overlap the second parts 89 when performing assembly as the auxiliary cover 84, are provided.

The second parts 89 (FIGS. 19 and 20) include claws 100, 101, 102, 103, 104, and 105 which serve as engaged portions and are engaged with the engagement portions 120, 115, 116, 117, 118, and 119 (FIG. 15) which are provided on the cover main body 82 side.

Furthermore, in the second parts 89, a surface 95 in FIG. 19 is oriented toward the side opposing the document stand 3a, that is, in the −Z direction, and a surface 96 in FIG. 20 is disposed to be oriented toward the cover main body 82 side.

FIG. 21 illustrates a state where two first parts 86a and 86b are attached to the cover main body 82. Furthermore, in FIG. 15, among the engagement portions 110, 111, 112, 113, and 114, at a part at which the claws 90, 91, 92, 93, and 94 of the first parts 86a are engaged, a reference numeral a is attached after the numbers (for example, 110a). Similarly, in the engagement portion which corresponds to the first parts 86b, a reference numeral b is attached after the numbers (for example, 111b).

The first opening portion 97 and the second opening portion 98 which correspond to the first parts 86a and the first parts 86b, are respectively called a first opening portion 97a and a second opening portion 98a, and a first opening portion 97b and a second opening portion 98b.

As illustrated in FIGS. 22 and 23, in each engagement portion (for example, an engagement portion 110*a* in FIG. 22 and an engagement portion 112*a* in FIG. 23), corresponding claws (a claw 90*a* with respect to the engagement portion 110*a* in FIG. 22, and a claw 92*a* with respect to the engagement portion 112*a* in FIG. 23) are hooked to get thereinto.

In addition, as illustrated in FIG. 21, when the two first parts 86*a* and 86*b* are attached to the cover main body 82, engagement portions 115*a*, 120*b*, 115*b*, and 120*a* are exposed from the first opening portion 97*a*, the second opening portion 98*a*, the first opening portion 97*b*, and the second opening portion 98*b* (refer to FIGS. 24 and 25).

After attaching the two first parts 86*a* and 86*b*, the two remaining second parts 89*a* and 89*b* are attached to the cover main body 82, and a state where the rectangular auxiliary cover 84 is bonded to the cover main body 82 (FIG. 16) is achieved.

The second parts 89*a* and 89*b* overlap the first parts 86*a* and 86*b* in the step difference portions 121 and 122 (FIG. 21). In this manner, by overlapping the first parts 86 and the second parts 89 at a boundary part thereof, the rigidity as the entire cover 80 is improved.

In the invention, a case where the auxiliary cover 84 is configured of four parts including the two first parts 86 and the two second parts 89, is described, but the number of parts is not limited to four as long as the number is two or more. In addition, the shape of all of the plural parts may be the same, or may be different.

In addition, as the auxiliary cover 84 is configured of the plurality of small parts, it is possible to make the "curve" which is generated to be large in a case where the auxiliary cover 84 is formed in one plate-like body, small.

According to this, a void between the cover 80 and the document stand 3*a* is reduced, and it is possible to more effectively press the document, and to improve reading accuracy in the reading mechanism portion 3.

In addition, since the auxiliary cover 84 is configured of the small components (the first parts 86 and the second parts 89), for example, a small number of measurement points for managing the component shape, such as the curve, may be employed, and it is possible to reduce component managing costs.

Furthermore, attachment of the first parts 86*a* and 86*b* and the second parts 89*a* and 89*b* to the cover main body 82 can also be attachment by an adhesive or a screw, but it is possible to easily assemble and dissemble the apparatus by a configuration of fastening by a claw-like member.

In addition, in the cover 80 which opens and closes the upper portion of the document stand 3*a*, the configuration of forming the auxiliary cover 84 by a plurality of small parts is not limited to the printer 1 which serves as a multifunction machine including the recording mechanism portion 15 and the reading mechanism portion 3, and it is also possible to use the configuration in a reading mechanism portion single body, that is, an image reading apparatus, such as a scanner.

At the lower part (−Z direction) of the auxiliary cover 84, similar to the above-described Example 1, the document pressing mat (not illustrated) is provided. An elastic mat which is configured of an elastic body can also be provided between the document pressing mat and the auxiliary cover 84.

Regarding Paper Transporting Path in Recording Mechanism Portion

Hereinafter, a paper transporting path in the recording mechanism portion 15 of the printer 1 will be described with reference to FIG. 2. First, feeding of the paper sheet from the manual feed tray 7 will be described, and then, feeding of the paper sheet from the lower step side tray 13 or the upper step side tray 14 provided in the bottom portion of the apparatus, will be described.

Furthermore, in FIG. 2, a feeding path T1 of a paper sheet P from the manual feed tray 7 is illustrated by a two-dot chain line. In addition, a feeding path T2 of the paper sheet P from the lower step side tray 13 or the upper step side tray 14 to the upstream side of a transport driving roller 24 is illustrated by a dot line.

The highest paper sheet set by a set port 50 of the manual feed tray 7, is picked up by the second feeding roller 21 and sent to the downstream side.

At a tip of the second feeding roller 21, the transport driving roller 24 driven to be rotated by the motor which is not illustrated, and a transport driven roller 25 which is rotated to be driven being in contact with the transport driving roller 24, are provided, and the paper sheet P is sent to a lower part of the recording head 30 by the rollers.

Next, the recording head 30 which discharges ink as a liquid is provided in the bottom portion of a carriage 29, and the carriage 29 is driven to reciprocate in the auxiliary scanning direction (X-axis direction) by the motor which is not illustrated.

At a position which opposes the recording head 30, a medium supporting member 28 which supports the transported paper sheet P is provided, and an interval (PG) between the paper sheet P and the recording head 30 is regulated by the medium supporting member 28.

In addition, on the downstream side of the medium supporting member 28, a discharge driving roller 31 which is driven to be rotated by the motor which is not illustrated, and a discharge driven roller 32 which is rotated to be driven being in contact with the discharge driving roller 31, are provided. The paper sheet P on which the recording is performed by the recording head 30 is discharged toward the above-described paper discharge receiving tray 8 by the rollers.

In addition, the printer 1 includes the lower step side tray 13 and the upper step side tray 14 in the bottom portion of the apparatus, and the paper sheets can be fed one by one from the lower step side tray 13 or the upper step side tray 14.

The upper step side tray 14 is configured to be provided to be slidable (displacement) between a feedable position (FIG. 2) and a retreating position (not illustrated) moved to the apparatus front surface side (the rightward direction in FIG. 2: the drawing-out direction side of the upper step side tray 14), to receive the power of the motor which is not illustrated, and to displace the feedable position and the retreating position.

Furthermore, in FIG. 2, respectively, a paper sheet accommodated in the lower step side tray 13 is illustrated by a reference numeral P1, and a paper sheet accommodated in the upper step side tray 14 is illustrated by a reference numeral P2 (hereinafter, in a case where it is not necessary to particularly distinguish, the paper sheet is referred to as "paper sheet P").

A first feeding roller (also called a pickup roller) 10 which is driven to be rotated by the motor which is not illustrated, is provided in a roller supporting member 11 (also called a pickup arm or an oscillation member) which oscillates around a rotation shaft 12, and when the upper step side tray 14 slides and is at an butting position on the most apparatus rear side (the leftward direction in FIG. 2: the mounting direction side of the upper step side tray 14, and the paper sending-out direction side), at the feedable position of the upper step side tray 14, as the first feeding roller 10 rotates being in contact with the highest paper sheet P2 accommodated in the upper step side tray 14, the highest paper sheet P2 is sent out from the upper step side tray 14.

Meanwhile, in a state where the upper step side tray 14 slides to the apparatus front surface side (+Y side), that is, when the upper step side tray 14 is at the above-described retreating position, the roller supporting member 11 oscillates around the rotation shaft 12, the first feeding roller 10 can be in contact with the highest paper sheet P1 accommodated in the lower step side tray 13, and as the first feeding roller 10 rotates, the highest paper sheet P1 is sent out from the lower step side tray 13.

Furthermore, as described above, even in a case where the paper sheet is not mounted on any one side, the lower step side tray 13 and the upper step side tray 14 can feed the paper sheet from the other side.

On the downstream side of the first feeding roller 10, an intermediate roller 17 which is driven to be rotated by the motor which is not illustrated is provided, and the paper sheet P is curved and reversed by the intermediate roller 17, and is toward the apparatus front side. Furthermore, reference numerals 19 and 20 are driven rollers which can be rotated to be driven, and at least the paper sheet P is nipped by the driven roller 19 and the intermediate roller 17, and additionally, is nipped by the terminal 20 and the intermediate roller 17, and sent to the downstream side.

The paper sheet sent along the feeding path T2 illustrated by a dot line is merged with the feeding path T1 (two-dot chain line) in front of the transport driving roller 24 and the transport driven roller 25, and further on the downstream side, similar to the paper sheet fed from the manual feed tray 7, the paper sheet is transported by the transport driving roller 24 and the transport driven roller 25, and is discharged toward the paper discharge receiving tray 8 by the discharge driving roller 31 and the discharge driven roller 32 after the recording is performed by the recording head 30.

In addition, in a case where the recording is performed on both surfaces of the paper sheet P, after the recording is performed on a front surface by the recording head 30, by switching back, the paper sheet P enters the transporting path from a lower side of the intermediate roller 17, and by curving and reversing, it is possible to perform the recording on a rear surface of the paper sheet P. Furthermore, a reference numeral 18 is a driven roller which can be rotated to be driven by the rotation of the intermediate roller 17.

Furthermore, the invention is not limited to the above-described embodiment, various modifications are possible within a range of the invention described in the range of the claims are possible, and the modifications are included in the range of the invention.

The entire disclosure of Japanese Patent Application No. 2016-035249, filed Feb. 26, 2016 is expressly incorporated by reference herein.

What is claimed is:

1. A reading apparatus comprising:
a main body portion provided with a document stand on which a document is placed and a reading unit which reads the document;
a cover which opens and closes the document stand; and
a near field communication unit for performing near field communication on the inside of the cover such that the near field communication unit faces the document stand when the cover is closed.

2. The reading apparatus according to claim 1,
wherein the near field communication unit is provided outside a region that overlaps a moving region of the reading unit in a state where the cover is closed.

3. The reading apparatus according to claim 1,
wherein the cover includes a cover main body which forms an upper surface of the cover, and an auxiliary cover which nips the near field communication unit between the auxiliary cover and the cover main body, and covers the near field communication unit.

4. The reading apparatus according to claim 3, further comprising:
a metal plate in a region that avoids the near field communication unit between the auxiliary cover and the cover main body.

5. The reading apparatus according to claim 4,
wherein the cover is provided to be capable of opening and closing the document stand by rotating around a rotation shaft provided in an end portion in the direction intersecting with the moving direction of the reading unit,
wherein a thin portion is formed along the moving direction of the reading unit outside a region that overlaps a moving region of the reading unit in a state where the cover is closed, on a free end side of the cover main body, and
wherein the metal plate and the near field communication unit are disposed in the thin portion.

6. The reading apparatus according to claim 3,
wherein play is provided in a bonding portion between the cover main body and the auxiliary cover.

7. A recording apparatus comprising:
a recording mechanism portion provided with a recording unit that performs recording on a recording medium; and
a reading mechanism portion which is provided in an upper portion of the recording mechanism portion, and reads a document,
wherein the reading mechanism portion includes a main body portion provided with a document stand on which the document is placed and a reading unit that reads the document, and a cover that opens and closes the document stand,
wherein the recording mechanism portion includes an operation panel on an apparatus front surface, and
wherein the cover has a part that approaches an upper portion of the operation panel in a closed state, and the near field communication unit is disposed in the part of the cover that approaches the upper portion of the operation panel.

8. The recording apparatus according to claim 7,
wherein the recording mechanism portion includes a power source portion which supplies power when driving a driving target including the recording unit, and
wherein the near field communication unit is positioned above the power source portion in a state where the cover is closed.

9. A recording apparatus comprising:
a recording mechanism portion provided with a recording unit that performs recording on a recording medium; and
a reading mechanism portion which is provided in an upper portion of the recording mechanism portion, and reads a document,
wherein the reading mechanism portion includes a main body portion provided with a document stand on which the document is placed and a reading unit that reads the document, and a cover that opens and closes the document stand, and wherein the cover includes a plate having high rigidity of the cover, and a near field communication unit provided in a region shifted from a disposition region of the plate such that the near field communication unit faces the document stand when the cover is closed.

10. The recording apparatus according to claim 9, wherein the near field communication unit is provided at a position which is in a region that overlaps a moving region of the reading unit in a state where the cover is closed, that is, which is shifted from a home position of the reading unit.

* * * * *